(12) United States Patent
MacDuff et al.

(10) Patent No.: US 9,699,653 B2
(45) Date of Patent: Jul. 4, 2017

(54) APPARATUSES FOR AUTHENTICATING A WIRELESS CONNECTION USING TIME RELATED USER ACTIONS

(71) Applicant: FiftyThree, Inc., New York, NY (US)

(72) Inventors: Ian MacDuff, Seattle, WA (US); Jonathan R. Harris, Redmond, WA (US); Andrew A. MacBeth, Seattle, WA (US)

(73) Assignee: FiftyThree, Inc., New York, NY (US)

( * ) Notice: Subject to any disclaimer, the term of this patent is extended or adjusted under 35 U.S.C. 154(b) by 0 days.

(21) Appl. No.: 14/340,439

(22) Filed: Jul. 24, 2014

(65) Prior Publication Data

US 2015/0050879 A1    Feb. 19, 2015

Related U.S. Application Data

(60) Provisional application No. 61/857,817, filed on Jul. 24, 2013.

(51) Int. Cl.
*H04W 12/06* (2009.01)
*H04W 76/06* (2009.01)
*H04B 5/00* (2006.01)

(52) U.S. Cl.
CPC .......... *H04W 12/06* (2013.01); *H04B 5/0031* (2013.01); *H04B 5/0056* (2013.01); *H04W 76/06* (2013.01)

(58) Field of Classification Search
CPC .... G06F 3/03545; G06K 9/222; G06K 17/00; H04W 12/06; H04W 76/06
See application file for complete search history.

(56) References Cited

U.S. PATENT DOCUMENTS

| | | | |
|---|---|---|---|
| 8,364,129 B1* | 1/2013 | Beyer, Jr. .......... | H04M 1/72572 455/414.2 |
| 8,538,393 B1* | 9/2013 | Beyer, Jr. ............. | H04W 12/08 455/403 |
| 8,754,863 B2* | 6/2014 | Anantha ............... | G06F 3/0488 345/173 |
| 9,147,057 B2* | 9/2015 | Raffa .................. | G06F 3/04883 |
| 9,389,691 B2* | 7/2016 | Gardenfors ............. | G06F 3/017 |
| 2007/0080823 A1* | 4/2007 | Fu .......................... | G08C 23/04 340/4.3 |
| 2007/0188323 A1* | 8/2007 | Sinclair ................. | G06F 21/445 340/568.1 |

(Continued)

*Primary Examiner* — Bobbak Safaipour
*Assistant Examiner* — Devan Sandiford
(74) *Attorney, Agent, or Firm* — John R. Thompson; Stoel Rives LLP

(57) ABSTRACT

In some embodiments, a wireless pairing method involves a touchscreen on a wireless host device combined with a switch on a wireless stylus device. The wireless pairing method uses the time-coincidence of a touch on the host device screen with the detection of a tip switch press on the stylus device as a mode of out-of-band communication to authenticate a pairing of the devices. In such embodiments, a user presses a tip portion of the stylus device against a pairing spot on the host device surface; the wireless devices then form a bonded pair if the touch and/or release of the tip portion of the stylus device with respect to the host device surface are within a pre-determined time co-incidence window of the detection by the host device of that touch and/or release of the tip portion of the stylus device.

16 Claims, 19 Drawing Sheets

(56) References Cited

U.S. PATENT DOCUMENTS

| | | | |
|---|---|---|---|
| 2007/0287386 A1* | 12/2007 | Agrawal | H04W 76/023 455/67.11 |
| 2008/0240440 A1* | 10/2008 | Rose | H04L 63/08 380/277 |
| 2009/0153342 A1 | 6/2009 | Thorn | |
| 2011/0126009 A1 | 5/2011 | Camp, Jr. et al. | |
| 2011/0247045 A1* | 10/2011 | Rajagopal | H04L 63/08 726/1 |
| 2012/0242603 A1* | 9/2012 | Engelhardt | G06F 3/03545 345/173 |
| 2013/0106723 A1* | 5/2013 | Bakken | G06F 3/03545 345/173 |
| 2013/0106725 A1* | 5/2013 | Bakken | G06F 3/033 345/173 |
| 2013/0106731 A1* | 5/2013 | Yilmaz | G06F 3/0346 345/173 |
| 2013/0106740 A1* | 5/2013 | Yilmaz | G06F 3/038 345/173 |
| 2013/0106800 A1* | 5/2013 | Yilmaz | G06F 3/03545 345/179 |
| 2013/0171935 A1* | 7/2013 | Tsai | H04W 12/04 455/41.2 |
| 2013/0173702 A1* | 7/2013 | Lang | H04L 41/28 709/204 |
| 2013/0340028 A1* | 12/2013 | Rajagopal | H04L 63/08 726/1 |
| 2014/0043245 A1* | 2/2014 | Dowd | G06F 3/03545 345/173 |
| 2014/0104224 A1* | 4/2014 | Ih | G06F 3/044 345/174 |
| 2014/0146021 A1* | 5/2014 | Trethewey | G06F 3/0488 345/179 |
| 2014/0300554 A1* | 10/2014 | Samuel | G06F 21/32 345/173 |
| 2014/0380187 A1* | 12/2014 | Gardenfors | G06F 3/017 715/748 |
| 2016/0195941 A1* | 7/2016 | Gur | G06F 3/03545 345/173 |

* cited by examiner

Example Stylus and Host Device

Example Stylus Components

Example Host Device Components

Example Logic Flow: Authenticating a Connection

Example Logic Flow: Switching Styluses

Example Connection User Experience

Drawing with the Stylus on the Host

Turning off the Stylus

Turning off the Stylus

Host Goes out of Range and Returns

Accidental Turn on of Stylus (When Drawing)

Accidental Turn on Stylus (Stuck Tip Switch)

Stylus Changes Host
(Both Hosts in Range)

Stylus Changes Host
("From" Host Out of Range)

Host Changes Stylus
(Both Styli in Range)

Host Changes Stylus ("from" Stylus out of Range)

Host Connects to Wrong Stylus

APPARATUSES FOR AUTHENTICATING A WIRELESS CONNECTION USING TIME RELATED USER ACTIONS

PRIORITY CLAIMS

This application is a non-provisional of, and claims priority under 35 U.S.C. §119 to U.S. provisional application Ser. No. 61/857,817, filed Jul. 24, 2013, titled "Methods and Apparatus for Pairing Wireless devices".

This application is related to co-pending Patent Cooperation Treaty (PCT) International Patent Application PCT/US14/48080, filed on the same date.

This application is related to co-pending U.S. Non-Provisional patent application Ser. No. 14/340,264, PCT International Patent Application PCT/US14/48053, both filed on the same date, and entitled "Methods and Apparatus for Implementing Dual Tip Functionality in a Stylus Device"; U.S. Non-Provisional patent application Ser. No. 14/340,287, filed on the same date, and entitled "Methods and Apparatus for Providing Universal Stylus Device with Functionalities"; U.S. Non-Provisional patent application Ser. No. 14/340,345, US 317784-2032, PCT International Patent Application PCT/US14/48064, both filed on the same date, and entitled "Stylus Having a Deformable Tip and Methods of Using the Same."

All of the aforementioned applications are hereby expressly incorporated by reference.

BACKGROUND

Some embodiments described herein relate generally to methods and apparatus for pairing wireless devices. More specifically, the embodiments described herein relate to pairing a wireless electronic pen or stylus device to an electronic host device such as an electronic tablet.

Wireless devices often use secure bonded pairs to facilitate one-to-one communication. Known methods for pairing wireless devices typically use propagating signals, e.g., electromagnetic radio signals, to exchange data for the pairing event. For example, several wireless communication standards such as Institute of Electrical and Electronics Engineering (IEEE) 802.11b/g specify mechanisms for wireless device pairing. Such known methods, however, have shortcomings in providing wireless device pairing. Such pairing methods can involve a user to input (or type) a series of symbols such as, for example, a personal identification number (PIN) code, and hexadecimal or American Standard Code for Information Interchange (ASCII) characters for IEEE's 802.11b's Wireless Equivalent Privacy (WEP) protocol, to validate that a first wireless device is securely pairing with a targeted second wireless device. Such pairing methods, however, are cumbersome to the user and are incompatible in devices that have no keypad, display medium, graphical user interface (GUI), and/or the like.

Out-of-band communication (OOB) is a mode of communication between wireless devices that is not through the primary wireless communication channel. Wireless devices often use OOB to authenticate a pairing attempt without codes and/or keys such as, for example, using short range near-field (NF) communication radios to confirm that devices are in close proximity. The use of OOB communications, however, often involves complex and heavy computations and can result in pairing delays. Additionally, OOB communications also often involve use of an extra radio transceiver on both wireless devices, thus adding extra complexity and expense to the device manufacture.

Accordingly, a need exists for methods and apparatus for implementing automatic wireless pairing between wireless devices using out-of-band communication without the need for extra transceivers and user input of security credentials.

SUMMARY

In some embodiments, a wireless pairing method involves a touchscreen on a wireless host device combined with a switch on a wireless stylus device. The wireless pairing method uses the time-coincidence of a touch on the host device screen with the detection of a tip switch press on the stylus device as a mode of out-of-band communication to authenticate a pairing of the devices. In such embodiments, a user presses a tip portion of the stylus device against a pairing spot on the host device surface; the wireless devices then form a bonded pair if the touch and/or release of the tip portion of the stylus device with respect to the host device surface are within a pre-determined time co-incidence window of the detection by the host device of that touch and/or release of the tip portion of the stylus device.

In some embodiments, a device is disclosed, including: a sensor to measure a first user action in connection with the first device, the first user action having a first characteristic; a wireless receiver to receive, from a second device, a signal including information relating to a second user action in connection with the second device, the second user action having a second characteristic; and a processor operatively coupled to the sensor and the wireless receiver, the processor to: authenticate a wireless connection between the first device and the second device when a difference between the first characteristic and the second characteristic is below a pre-determined threshold, and disconnect the wireless connection between the first device and the second device when the difference between the first characteristic and the second characteristic is above the pre-determined threshold.

DETAILED DESCRIPTION

Figure 1:
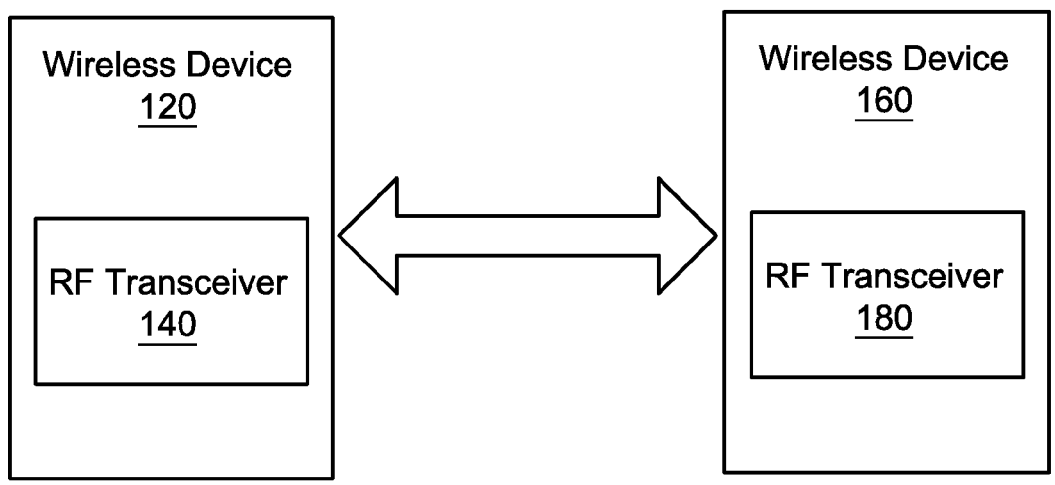
FIG. 1 is a system block diagram of a first wireless device in wireless communication with a second wireless device, according to an embodiment.

In some embodiments, a wireless pairing method involves a touchscreen on a wireless host device combined with a switch on a wireless stylus device. The wireless pairing method uses the time-coincidence of a touch on the host device screen with the detection of a tip switch press on the stylus device as a mode of out-of-band communication to authenticate a pairing of the devices. In such embodiments, a user presses a tip portion of the stylus device against a pairing spot on the host device surface; the wireless devices then form a bonded pair if the touch and/or release of the tip portion of the stylus device with respect to the host device surface are within a pre-determined time co-incidence window of the detection by the host device of that touch and/or release of the tip portion of the stylus device.

For example, when a user intends to wirelessly connects a first device (e.g., a tablet computer, a cell phone, a smartphone, etc.) with a second device (e.g., a stylus pen, a headset, a wireless keyboard, a wireless mouse, etc.), the user can perform a user action on each of the device, e.g., by pressing a stylus on the first device, by making a motion of both devices (e.g., shake, etc.). For the first device to authenticate a connection with the second device, the second device sends a signal to the first device including information measured by the second device, such as a time window within which the user action occurs on the second device, motion parameters of the second device, location parameters of the second device, and/or the like. The first device may then compare the received information about the user action that occurred for the second device, with the user action that the first device has sensed. If the two user actions have sufficiently similar characteristic values (e.g., both within a sufficiently small time coincidence window, sufficiently same motion, etc.), the first device can authenticate a wireless connection between the two devices. Or otherwise, if the comparison fails to find a match (e.g., within a pre-defined threshold) between the two user actions (e.g., the stylus presses on a table without pressing the first device, then the first device would not sense any user action, etc.), the first device may discontinue any wireless connection with the second device.

In some instances, the wireless pairing between the host device and the stylus device can operate via an out-of-band communication link. For example, the out-of-band communication link may include a Near Field Communication (NFC) link, which can operate when the host device and the stylus device are within a close physical communication range (e.g., 10 cm, etc.). The out-of-band communication link is out of band in the sense that that the host device can be intended to communicate with other communication devices via an in-band connection(s) specifically intended for such communications. For example, a smart phone can communicate with other communication devices via a connection(s)/link(s) (in-band) to a mobile phone network; such a connection(s)/link(s) can operate over a range of pre-defined frequencies. In such instances, the out-of-band communication link can operate over a range of frequencies that is mutually exclusive from the range of predefined frequencies for the in-band communications. In other instances, the wireless paring may operate via in-band communication links for other primary wireless networks, e.g., an in-band communication link, such as, but not limited to Wi-Fi®, third generation mobile telecommunications (3G), fourth generation mobile telecommunications (4G), and/or the like. For example, a host device can establish a connection with a stylus device via the in-band communication link, e.g., under the Wi-Fi® network.

As used in this specification, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

As used in this specification, the singular forms "a," "an" and "the" include plural referents unless the context clearly dictates otherwise. Thus, for example, the term "a stylus device" is intended to mean a single stylus device or multiple stylus devices.

FIG. 1 is a system block diagram of a first wireless device in wireless communication with a second wireless device, according to an embodiment. The first wireless device 120 includes a radio-frequency (RF) transceiver 140 and the second wireless device 160 includes an RF transceiver 180. The first wireless device 120 can be any electronic pen or electronic stylus device that can be used for writing on, drawing on or otherwise providing input to a surface of an electronic host device (e.g., an electronic tablet). The second wireless device 160 can be any electronic tablet device manufactured by different manufacturers such as, for example, the Apple iPad®, the Samsung ATIV Smart PC®, the Samsung Galaxy®, the Amazon Kindle Fire®, the Toshiba Excite®, and/or the like. The RF transceiver 140 of the first wireless device 120 can connect with the RF transceiver 180 of the second wireless device 160 using any wireless communication technology such as, for example, IEEE 802.11 Wireless Fidelity (Wi-Fi®), Bluetooth®, Bluetooth® Low Energy (e.g., Bluetooth® 4.0, Bluetooth® Smart), Near-Field Communication (NFC) protocol, and/or the like.

The first wireless device 120 can be brought in proximity to the second wireless device 160 and can establish a wireless channel to exchange a set of first wireless device information and a set of second wireless device information. The first wireless device 120 and the second wireless device 160 can enter a trusted pairing mode without user intervention to establish a primary wireless channel in accordance with the set of first wireless device information and the set of second wireless device information. The set of first wireless device information and the set of second wireless device information can include, for example, Bluetooth® device information of the first wireless device 120 and the second wireless device 160.

In some configurations, the wireless pairing method can use the time-coincidence of a touch and/or release of the first wireless device 120 on the second wireless device 160 surface; the detection of the touch and/or release of the first wireless device 120 by the second wireless device 160 can be a form or a mode of out-of-band communication to authenticate the pairing of the wireless devices. Hence, when a user presses the tip portion of the first wireless device 120 against a pairing spot on the second wireless device 160 surface, the first wireless device 120 and the second wireless device 160 can form a bonded pair if the touch and/or release of the tip portion of the first wireless device 120 and the detection of the touch and/or release of the first wireless device 120 by the second wireless device 160 occur within a pre-determined time co-incidence window (i.e., are sufficiently close in time). A pairing spot can be, for example, a specific location, a specified colored region, or icon on the host device surface (e.g., a screen) that is used to initiate and/or establish wireless pairing between the host device and a stylus device. The pairing spot can be a virtual pairing spot defined on the host device surface by executing, for example, a control program in the host device processor. Such a control program can facilitate wireless communication between the host device and the stylus device and can define, for example, the location of the pairing spot, the size of the pairing spot, the shape of the pairing spot, the color displayed inside the pairing spot, the boundary of the pairing spot, a pressure value that can indicate a tip portion touch on the pairing spot, a pressure value that can indicate a tip portion release from the pairing spot, and/or the like. In other configurations, pairing of the first wireless device 120 and the second wireless device 160 can be initiated by the touch (or contact or press) of the first wireless device 120 on any location on the surface of the second wireless device 160 (i.e., a specific pairing spot does not exist on the surface of the second wireless device 160).

Upon establishing successful wireless pairing between the first wireless device 120 and the second wireless device 160, the wireless devices 120 and 160 can be ready for coordinated use. In some instances, the second wireless device 160 can be used to capture handwriting and/or brush strokes produced by the first wireless device 120 on the surface of the second wireless device 160, and can convert the handwritten analog information into digital data, thus enabling the data to be used in various applications. For example, the writing data can be digitized and displayed on the monitor or screen of the second wireless device 160. The data can also be interpreted by optical character recognition (OCR) software and used in different applications or used as graphical display.

Figure 2:
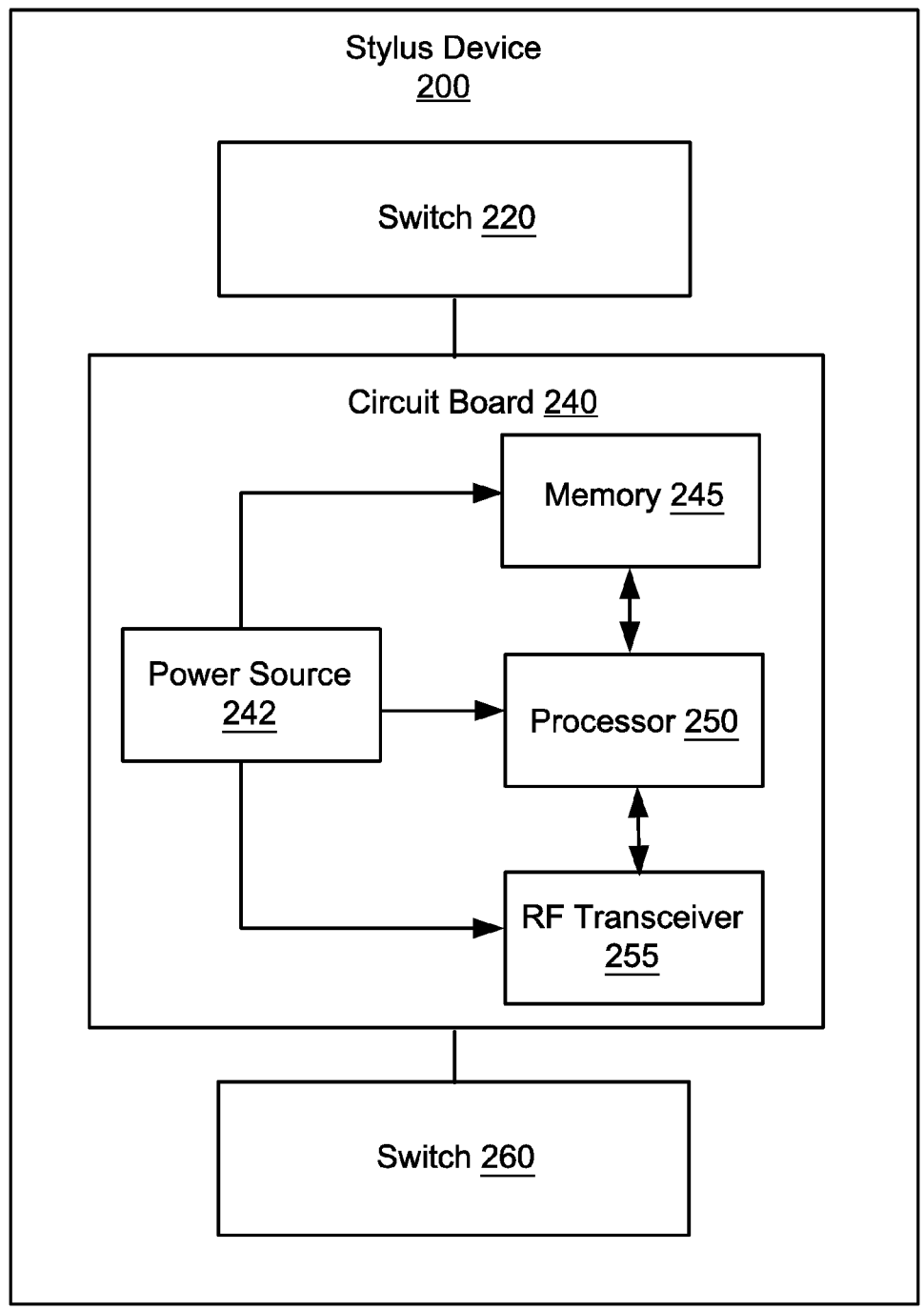
FIG. 2 is a system block diagram of a stylus device with two active end portions, according to an embodiment.

FIG. 2 is a system block diagram of a stylus device with two active end portions, according to an embodiment. The stylus device 200 includes a first switch 220 in a first end portion and a second switch 260 in a second end portion. In some configurations, the first end portion can be associated with, for example, a writing and/or drawing tip portion and the second end portion of the stylus device 200 can be associated with, for example, an eraser end portion. The switches 220 and 260 are connected to a circuit board 240 in the stylus device 200. The circuit board 240 can be, for example, a printed circuit board (PCB) upon which are mounted the electronics to determine the accurate position information associated with the stylus device 200, and establishing wireless pairing of the stylus device 200 with a host device (e.g., an electronic tablet). The circuit board 240 includes a power source 242, a memory 245, a processor 250 and an RF transceiver 255. The memory 245 can be, for example, a random access memory (RAM), a memory buffer, a database, an erasable programmable read-only memory (EPROM), an electrically erasable read-only memory (EEPROM), a read-only memory (ROM) and/or so forth. The memory 245 can store instructions to cause the processor 250 to execute processes and/or functions associated with the stylus device 200. For example, the memory 245 can store or implement the embedded firmware used for wireless pairing and communication of the stylus device 200 with a host device (the firmware can include the control program for the stylus device 200).

The processor 250 can be a general purpose processor, a field programmable gate array (FPGA), an application specific integrated circuit (ASIC), a digital signal processor (DSP), and/or the like. The processor 250 can run and/or execute processes and/or functions associated with the stylus device 200, and is operably coupled to a memory 245. The power source 242 supplies electric power to the different electronic components of the circuit board 240 and can be for example, an AAA battery, a lithium polymer battery, a solar panel power source, and/or the like. The RF transceiver 255 can send data units (e.g., data packets, data cells) to and/or receive data units from a host device using a variety of different wireless communication standards such as, for example, Wi-Fi®, Bluetooth®, Bluetooth® Low Energy (e.g., Bluetooth® 4.0, Bluetooth® Smart), Near-Field Communication (NFC) protocol, third generation mobile telecommunications (3G), fourth generation mobile telecommunications (4G), and/or the like.

In some configurations, the switches 220 and/or 260 can include a pressure transducer and can be activated when a specific end portion of the stylus device 200 is in contact (or pressing against) with the surface of a host device such as, for example, during writing or drawing or erasing, and force is applied to the specific end portion. In other configurations, the switches 220 and/or 260 can include or be coupled to a resistive touch sensor and can be activated when a specific end portion of the stylus device 200 is in contact with the surface of a host device. In yet other configurations, the switches 220 and/or 260 can include or be coupled to a capacitive touch sensor (e.g., a projected capacitance sensor).

The switches 220 and/or 260 when activated can send an electronic signal to the processor 250. The switches 220 and 260 are connected to a different input pin (or channel) of the processor 250 and thus the processor 250 can identify the switch 220 or 260 that is in the active mode. The processor 250 can generate and send a wireless signal via the RF transceiver 255 to the host device that identifies the "active" end portion of the stylus device 200. When the switch 220 or 260 is activated upon contact of the stylus device 200 with a host device surface (e.g., when a user touches or presses the stylus device 200 on the pairing spot on the host device surface or on any preselected location on the host device surface), the processor 250 can send a signal representing a set of stylus device information to the host device and can receive a signal representing a set of host device information from the host device via the RF transceiver 255 to initiate and establish wireless pairing with the host device.

In some configurations, the method of the wireless pairing includes the processor 250 sending to the host device a signal that informs the presence of the stylus device 200 to the host device (i.e., an advertising signal). The advertising signal sent to the host device can represent information such as, for example, the media access control address (MAC) address of the stylus device 200, the internet protocol (IP) address of the stylus device 200, a verification identifier (ID) associated with the stylus device 200, and/or the like. The verification ID can be, for example, a string of arbitrary random or pseudo-random numbers generated by the stylus device 200 to authenticate itself to the host device. The processor 250 can also receive a signal from the host device upon contact of the stylus device 200 to the host device. The signal received from the host device can represent information such as, for example, the media access control address (MAC) address of the host device, the internet protocol (IP) address of the host device, a verification identifier (ID) associated with the host device, and/or the like.

Upon receiving the signal from the host device and sending the advertising signal to the host device, the stylus device 200 can form or define a provisional wireless connection with the host device. The provisional wireless connection can alert a user that a connection has been established with a host device. Upon detection of the provisional wireless connection between the stylus device 200 and the host device, the user can stop pressing the stylus device tip portion on the host device. In such instances, the switch 220 or 260 is no longer activated and the stylus device 200 can detect that the tip portion is no longer in contact with the host device (e.g., when the stylus device 200 is released from the host device). The processor 250 can generate and can send a signal (e.g., a notification signal) to the host device that informs the host device that the stylus device 200 is no longer pressing against or in touch/contact with the host device. The host device receives the notification signal from the stylus device 200 and can also independently detect the end of contact with the stylus device. If the receipt of the notification signal by the host device and the detection by the host device of the release of the stylus device tip portion are sufficiently coincident in time (i.e., occurs within a pre-determined time co-incidence window), the stylus device 200 and the host device can form a persistent wireless bond (or connection).

Figure 3:
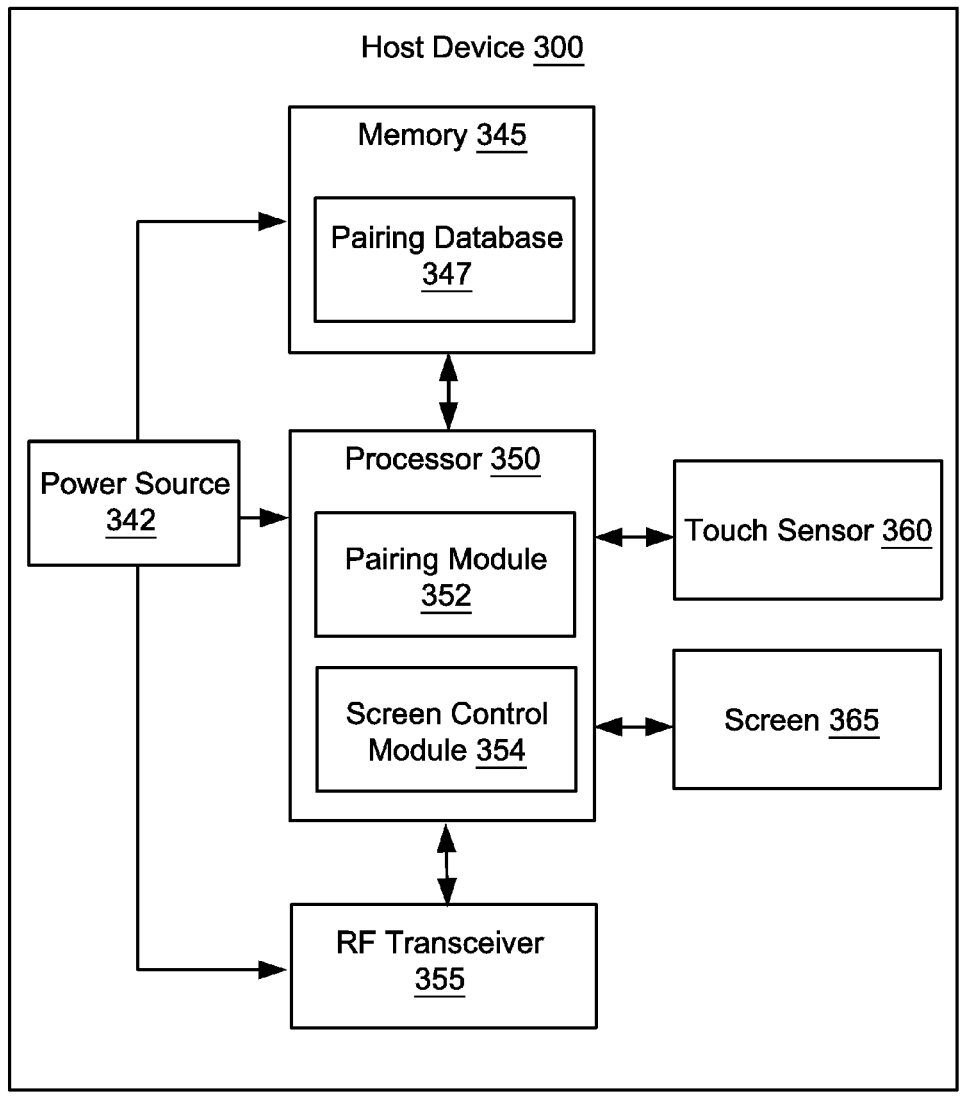
FIG. 3 is a system block diagram of a host device, according to an embodiment.

FIG. 3 is a system block diagram of a host device, according to an embodiment. The host device 300 can be any wireless electronic device such as, for example, an electronic tablet (e.g., an Apple iPad®, a Samsung ATIV Smart PC®, a Samsung Galaxy®, an Amazon Kindle Fire®, a Toshiba Excite®, etc.), a smart phone (e.g., an Apple iPhone®), a personal digital assistant (PDA), a laptop computer, and/or the like. The host device 300 includes a power source 342, a memory 345, a processor 350, an RF transceiver 355, a touch sensor 360 and a screen 365. The power source 342 supplies electric power to the different electronic components of the host device 300 and can be for example, an AAA battery, a lithium polymer battery, a solar panel power source, and/or the like. The RF transceiver 355 can send data units (e.g., data packets, data cells) to and/or receive data units from a stylus device using a variety of different wireless communication standards such as, for example, Wi-Fi®, Bluetooth®, Bluetooth® Low Energy (e.g., Bluetooth® 4.0, Bluetooth® Smart), Near-Field Communication (NFC) protocol, third generation mobile telecommunications (3G), fourth generation mobile telecommunications (4G), and/or the like.

The screen 365 can take a form as or include a surface of the host device 300. The screen 365 can be, for example, a liquid crystal display (LCD) screen or a light emitting diode (LED) alpha-numeric screen. The screen 365 can display the different applications that are downloaded and/or installed on the host device. The screen 365 can be used to display patterns drawn, written or otherwise input by a stylus device on the host device 300. The screen 365 can include a pairing spot (not shown in FIG. 3), which can be used to implement pairing of the host device 300 with a stylus device. The screen 365 can include a touch screen with which the touch sensors 360 are disposed so that the sensor 365 can sense a contact or touch on the surface of the touch screen. The touch sensor 360 can be, for example, a pushbutton switch, a resistive touch sensor, a capacitive touch sensor, and/or the like. For another example, the touch sensor 360 can include a pressure transducer that is operably coupled to the pairing spot on the host device screen (not shown in FIG. 3). The touch sensor 360 generates a first electrical signal in response to a pressure applied on the host device 300 screen by a stylus device. The touch sensor 360 can also generate a second electrical signal in response to release of pressure on the host device 300 screen by a stylus device. The touch sensor 360 can send the first electrical signal and the second electrical signal to the processor 350 where the electrical signals are processed for initiating, establishing or terminating a wireless pairing state between the host device 300 and a stylus device. Note that in some configurations, the screen 365 need not include a pairing spot. In such configurations, the pressure transducer in the touch sensor 360 can be operably responsive to all locations within the screen 365.

The memory 345 can be, for example, a random access memory (RAM), a memory buffer, a database, an erasable programmable read-only memory (EPROM), an electrically erasable read-only memory (EEPROM), a read-only memory (ROM) and/or so forth. The memory 345 can store instructions to cause the processor 350 to execute processes and/or functions associated with the host device 300. The memory 345 can also store the operating system for the host device 300 and the different applications that are downloaded and/or installed on the host device 300 (e.g., the application used for wireless pairing and communication with a stylus device, drawing applications that be used to draw patterns and/or write words on the screen 365 of the host device 300, etc.). The memory 345 can include a pairing database 347. The pairing database 347 can store information relevant to initiating, establishing and terminating wireless pairing state with a stylus device such as, for example, the MAC address of the host device 300, the IP address of the host device 300, verification identifier (ID) associated with the host device 300, a value of pressure (that can be set by default or by a user) that is indicative of contact or pressing of a stylus device on the surface on the host device 300, a value of pressure (that can be set by default or by a user) that is indicative of release of a stylus device from the surface of the host device 300, and any other numerical credentials that can be exchanged with a stylus device to initiate, establish or terminate a trusted wireless connection.

The processor 350 can be a general purpose processor, a field programmable gate array (FPGA), an application specific integrated circuit (ASIC), a digital signal processor (DSP), and/or the like. The processor 350 can run and/or execute processes and/or functions associated with the host device 300, and is operably coupled to the memory 345. The processor 350 can include a pairing module 352 and a screen control module 354. The pairing module 352 can be a hardware module or a software module (stored in the memory 345 and/or executed in the processor 350). The pairing module 354 can receive a signal from the touch sensor 360 that is indicative of a touch or pressing of a stylus device on the surface (or screen) of the host device 300 (e.g., a pressure-on signal). The pairing module 352 can generate and send a signal (e.g., a seeking signal) via the RF transceiver 355 used for detection by wireless devices within range of the RF transceiver 355 during establishment of a provisional wireless connection (or pairing) with the stylus device. The signal sent by the pairing module 352 can represent information such as, for example, the MAC address of the host device 300, the IP address of the host device 300, a verification identifier (ID) associated with the host device 300, and/or the like. The pairing module 353 can receive from the touch sensor 360 a signal that is indicative of release of (or contact with) the stylus device from the surface of the host device 300 (e.g., a pressure-off signal). The pairing module 352 can also receive from the stylus device and via RF transceiver 355 a signal (e.g., the notification signal) that informs the host device 300 that the stylus device is no longer pressing against (or in contact with) the host device 300. The pairing module 352 can process the timing information associated with the pressure-off signal and the notification signal to determine the time-coincidence of the signals. If the time-coincidence of the pressure-on signal and notification signal is less a pre-determined level (e.g., 50 msec), the pairing module 352 can send a signal to the stylus device to establish a persistent wireless connection (a trusted wireless bond) with the stylus device.

The screen control module 354 can be a hardware module or a software module (stored in the memory 345 and/or executed in the processor 350). The screen control module 354 can execute the operating system for the host device 300 (stored in the memory 345) and can provide, for example, a graphical user interface (GUI) for the user to control the host device 300. The screen control module 354 can convert the pressure information received from the touch sensor 360 (e.g., when the stylus device touches (or contacts) the pairing spot or any other preselected region on the host device 300 or when the stylus device is used to write, draw or erase patterns on (or otherwise interact with) the host device 300 surface) into spatial co-ordinates. The screen control module 354 can convert the handwritten analog information into digital data, thus enabling the data to be used in various applications. For example, the digitized data can be displayed by the screen control module 354 on the screen 365 of the host device 300. Alternatively or in addition, the screen control module 354 can run or execute an optical character recognition (OCR) software to interpret pressure patterns produced by the stylus device on the screen 365 and detect and display writing on the screen 365.

Note that the provisional wireless connection or link between a stylus device and a host device as described in FIGS. 2-3 occur upon initial contact (or touch or press) of the stylus device, in some instances, on a pairing spot on the host device surface and in other instances, on any location on the host device surface. The provisional wireless connection is a transient (mid-point) connection that can either lead to, in some instances, a persistent wireless connection between the stylus device and the host device, and in other instances, an unpairing of the stylus device and the host device and an unlinked state of both the devices. After the establishment of the provisional wireless linked state, a user can release the stylus device from the pairing spot of the host device surface (or from any preselected location on the host device surface). If the release of the stylus device from the host device and the detection of the release event by the host device is sufficiently coincident in time (e.g., occurs within a 50 msec window), a persistent wireless link (or connection) can be established between the stylus device and the host device (i.e., the provisional link turns into a persistent link). If not, the provisional wireless connection or link between the stylus device and the host device is terminated and both the stylus device and the host device return to an unlinked state. The persistent wireless connection or link between the stylus device and the host device is a temporary wireless connection that exists between the stylus device and the host devices for the duration of the use of the stylus device on the host device (e.g., in the range of minutes to hours) and can be terminated, for example, by the user after the conclusion of the desired task (e.g., by pressing the stylus device on the pairing spot or any other preselected location on the host device surface for a second time), if the stylus device is moved out of range of the host device by the user, if there is an accidental and/or intentional device power-off of the stylus device and/or the host device, if there is device malfunction of the stylus device and/or the host device, and/or the like.

The touch-(or physical-contact-) based pairing method between the stylus device 200 and the host device 300 described in FIGS. 1-3 has been presented by way of example only, and not limitation. In other embodiments, the stylus device and the host device can include an accelerometer that can record the motion when the stylus device and the host device 300 are held by a user and shaken in unison. In such embodiments, information related to the motion of the stylus device can be sent from the stylus device to the host device and the relative motion of the stylus device with respect to the host device can be calculated. If the relative motion of the stylus device with respect to the host device is below a pre-determined value, the host device can determine that the stylus device is moving in unison with the host device (synchronized motion) and the wireless pairing between the stylus device and the host device can be authenticated.

In other embodiments, the wireless pairing between the stylus device and the host device can be authenticated by, for example, the detection and processing of pressure modulation patterns in the stylus device and the host device. In yet other embodiments, the wireless pairing between the stylus device and the host device can be authenticated by, for example, the detection and processing of optical modulation patterns in the stylus device and host device. In such embodiments, the stylus device and the host device can include a light source and/or a light detector for the generation and detection of optical signals that can be used to analyze the optical modulation patterns. In other embodiments, the wireless pairing between the stylus device and the host device can be authenticated by, for example, the detection and processing of ultrasonic chirp modulation patterns (sound patterns) in the stylus device and host device. In such embodiments, the stylus device and the host device can include an ultrasound source and/or an ultrasound detector for the generation and detection of ultrasound signals that can be used to analyze the ultrasonic chirp modulation patterns. In other embodiments, the wireless pairing between the stylus device and the host device can be authenticated by, for example, a hybrid technique that can include a mix of two or more of the methods described above, and/or the like.

Figure 4A:
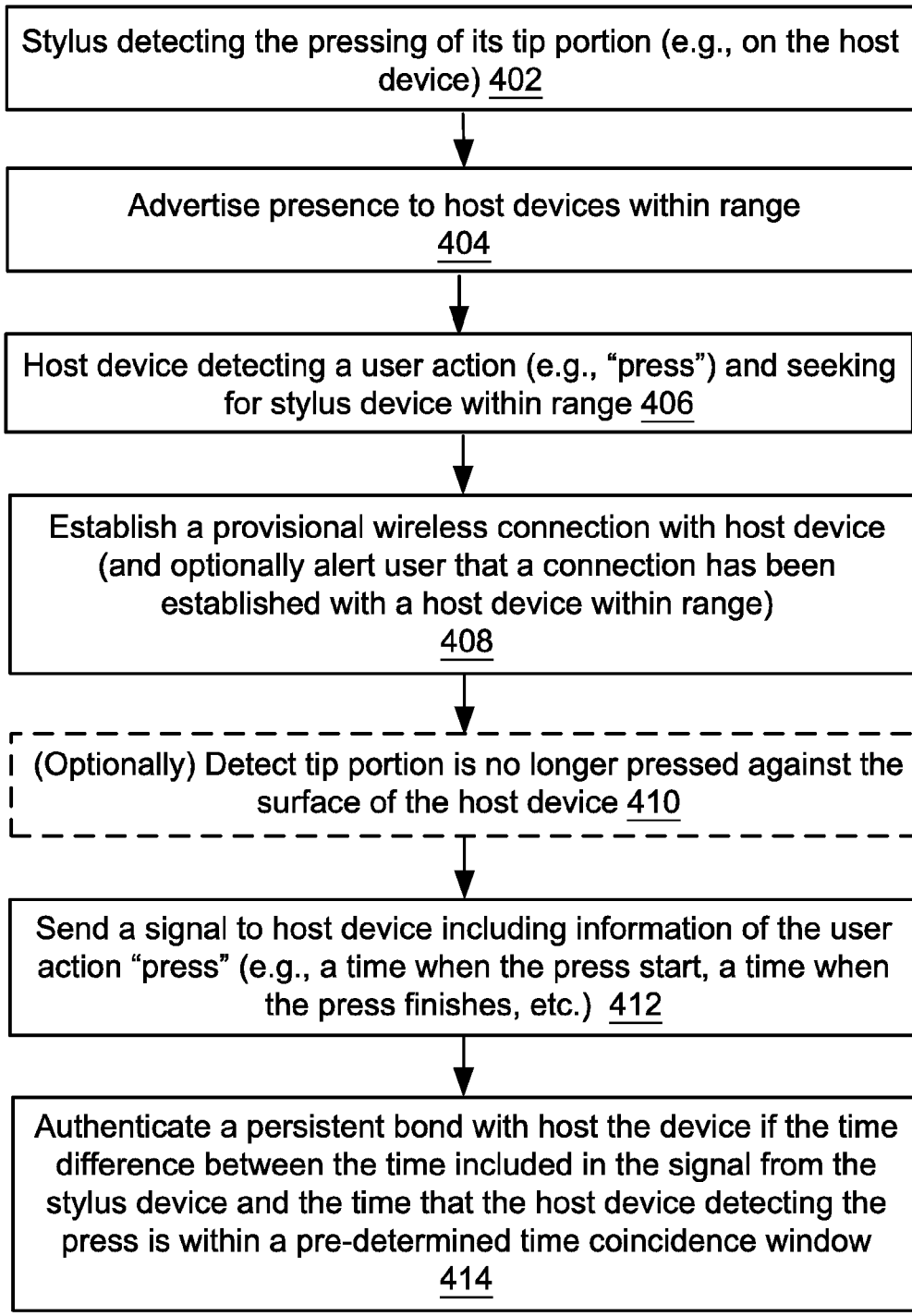
FIG. 4A is a flow chart illustrating a method for a stylus device to pair wirelessly with a host device, according to an embodiment.

FIG. 4A is a flow chart illustrating a method for a stylus device to pair wirelessly with a host device, according to an embodiment. The method 400 includes the stylus device detecting the pressing (or touch or contact) of the tip portion of the stylus device on the host device screen, at 402. When a user touches (or touches or contacts) the pairing spot (or any other preselected location) on the host device surface (or screen) with the stylus device tip portion, the switch of the end portion of the stylus device in contact with the host device screen is activated. The activated switch then sends a signal to the processor of the stylus device that is indicative of the pressing of the stylus device tip portion on the host device surface. The stylus device can be an electronic pen or electronic stylus that can be used for writing or drawing on an electronic host device and that is configured to perform one or more of the wireless pairing methods described herein. The host device can be any wireless electronic device such as, for example, an electronic tablet (e.g., an Apple iPad®, a Samsung ATIV Smart PC®, a Samsung Galaxy®, an Amazon Kindle Fire®, a Toshiba Excite®, etc.), a smart phone (e.g., an Apple iPhone®), a personal digital assistant (PDA), a laptop computer, and/or the like. In some instances, the stylus device can measure a characteristic value associated with the user action "press," such as a time when the "press" starts, a location indicator (e.g., GPS coordinate, etc.) of the stylus device, and/or the like.

At 404, the presence of the stylus device is advertised to host devices within range of the stylus device. For example, the stylus device can send a signal to "announce" the presence of the stylus device; and such signal can be received by host device within communication range (e.g., within a radius of 10 CM for NFC, etc.). The presence of the stylus device can be advertised via, for example, an advertising signal that can include or represent information such as, for example, the MAC address of the stylus device, the IP address of the stylus device, a verification ID associated with the stylus device, and/or the like. The verification ID can be, for example, a string of arbitrary random or pseudo-random numbers generated by the stylus device to authenticate itself to the host device. The advertising signal can be sent by, for example, the RF transceiver of the stylus device using any one or more of a variety of wireless communication standards such as, for example, Wi-Fi®, Bluetooth®, Bluetooth® Low Energy (e.g., Bluetooth® 4.0, Bluetooth® Smart), Near-Field Communication (NFC) protocol, third generation mobile telecommunications (3G), fourth generation mobile telecommunications (4G), and/or the like.

At 406, the host device can detect a user action, e.g., when the stylus device is pressing against the surface of the host device. In some configurations, the host device can detect the pressing (or contacting or touching) of the stylus device tip portion through a touch sensor included in the host device. In one example, upon detection of the contact of the stylus device tip portion, the host device can seek for stylus devices within a communication range, e.g., by optionally sending a signal that can represent information such as, for example, the MAC address of the host device, the IP address of the host device, a verification ID associated with the host device, and/or the like. The verification ID can be, for example, a string of arbitrary random or pseudo-random numbers generated by the host device to authenticate itself to, for example, the stylus device. The signal can be received by, for example, the RF transceiver of the stylus device using any one or more of a variety of wireless communication standards such as, for example, Wi-Fi®, Bluetooth®, Bluetooth® Low Energy (e.g., Bluetooth® 4.0, Bluetooth® Smart), Near-Field Communication (NFC) protocol, third generation mobile telecommunications (3G), fourth generation mobile telecommunications (4G), and/or the like. In some instances, the host device can measure a characteristic value associated with the user action "press," such as a time when the "press" starts, a location indicator (e.g., GPS coordinate, etc.) of the stylus device, and/or the like.

At 408, a provisional wireless connection (or bond or pairing) is established between the host device and the stylus device. A message may be optionally sent by, for example, the stylus device to a user alerting the user about the establishment of the provisional wireless connection. Upon detection of the provisional wireless connection between the stylus device and the host device, the user can optionally stop pressing the stylus device tip on the host device.

At 410, when a user releases the tip of the stylus from the host device, the stylus can optionally detect the tip portion of the stylus device being released from the surface, or no longer pressing (or contacting or touching) against the surface (or screen) of the host device occurs at, for example, the stylus device. When the tip portion of the stylus device is not pressing on the host device surface, the switch of the relevant end portion of the stylus device is no longer activated. The un-activated switch then sends a signal to the processor of the stylus device that is indicative of end of pressing and/or release of the stylus device tip portion from the host device surface. In some instances, the stylus device can optionally measure a first time when the "press" starts, and/or a second time when the "press" is released, so as to obtain a time window that the user action "press" occurs.

At 412, a signal is sent by, for example, the stylus device to the host device that represents information associated with the user action measured by the stylus tip portion (or contacting or touching), e.g., the time window when the "press" occurs, finishes and/or lasts. For example, the stylus device can generate and can send a signal (e.g., a notification signal) to the host device that informs the host device that the stylus device is no longer pressing (or contacting or touching) against the host device surface. The host device receives the notification signal from the stylus device and can also independently detect the end of pressing of the stylus device tip portion through a signal (e.g., a pressure-off signal) generated by, for example, a touch sensor included in the host device.

At 414, the host device can authenticate a persistent wireless connection (or bond or pairing) between the host device and the stylus device upon comparing a first characteristic associated with the user action measured by the host device (e.g., at 406) and a second characteristic associated with the user action obtained from the signal sent by the stylus device (e.g., at 412). For example, the wireless connection can be authenticated by the host device if the time difference between the end of the stylus device tip portion pressing on the host device and host device detecting the event is within a pre-determined time coincidence window, indicating the user action measured by the host device and the user action measured by the stylus device are sufficiently similar (e.g., the "press" sensed by the host device and the "press" sensed by the stylus device are unison and intended for the same connection attempt). Alternatively, when the time difference is not within the pre-determined time coincidence window, the host device can discontinue the provisional wireless connection (e.g., established at 408). In some instances, the pairing module of the host device can process the timing information associated with the pressure-off signal and the notification signal to determine the time-coincidence of the signals. If the time-coincidence of the pressure-off signal and the notification signal is less a pre-determined value (e.g., 50 msec), the stylus device can receive a signal from the pairing module of the host device to establish a persistent wireless connection (a trusted wireless bond) with the host device. On the other hand, if the stylus device has left contact from the host device for a period of time long enough, e.g., for a time lapse greater than a pre-determined threshold (e.g., 30 seconds, 45 seconds, etc.), the provisional bonding connection can be terminated by the host device and/or the stylus device.

In some instances, the stylus device can send an advertising signal (that advertises the presence of the stylus device to all wireless devices within range) after the stylus device makes contact (or touches or presses) with the surface of a host device only if the stylus device is initially in an unlinked state. If the stylus device is already in a persistent linked state with a host device, pressing the stylus device on the surface of the host device (e.g., during writing or drawing or erasing) will not create a new (set of) advertising signal(s) from the stylus device. Similarly, the host device can send a signal (that searches for all wireless devices within range) after the host device detects the contact (or press or touch) of stylus device with the surface of a host device only if the host device is initially in an unlinked state. If the host device is already in a persistent linked state with a stylus device, (e.g., during writing or drawing or erasing), contact of the stylus device with the surface of the host device will not create a new (set of) signal(s) from the host device.

In other instances, the stylus device can include a processor, and may alternatively authenticate a wireless connection. For example, the host device may send a signal to the stylus device including information relating to a user action that the host device has sensed and/or measured. The stylus device may in turn compare a characteristic of the user action that the host device has sensed and/or measured, with a characteristic of a user action sensed or measured by the stylus device itself, to determine whether the two user actions are sufficiently similar, e.g., in a similar fashion as discussed at 414. The stylus device can then authenticate a wireless connection when the two user actions are sufficiently similar, or discontinue any wireless connection between the stylus device and the host device when the two user actions are not sufficiently similar.

It is to be noted that although FIG. 4A shows the user action is a physical contact, e.g., "press" between the host device and the stylus device, and the times of the user action "press" are compared at 414 to determine whether two user actions are sufficiently similar, various other type of user actions are contemplated throughout the application. For example, the user action could be a motion of the stylus and/or the host device (e.g., shake, wave, etc.), and the characteristic of the user action could include, but not limited to location parameters (e.g., GPS coordinate, etc.), motion parameters (e.g., acceleration, velocity, orientation, direction, momentum, etc.), and/or the like.

Figure 4B:
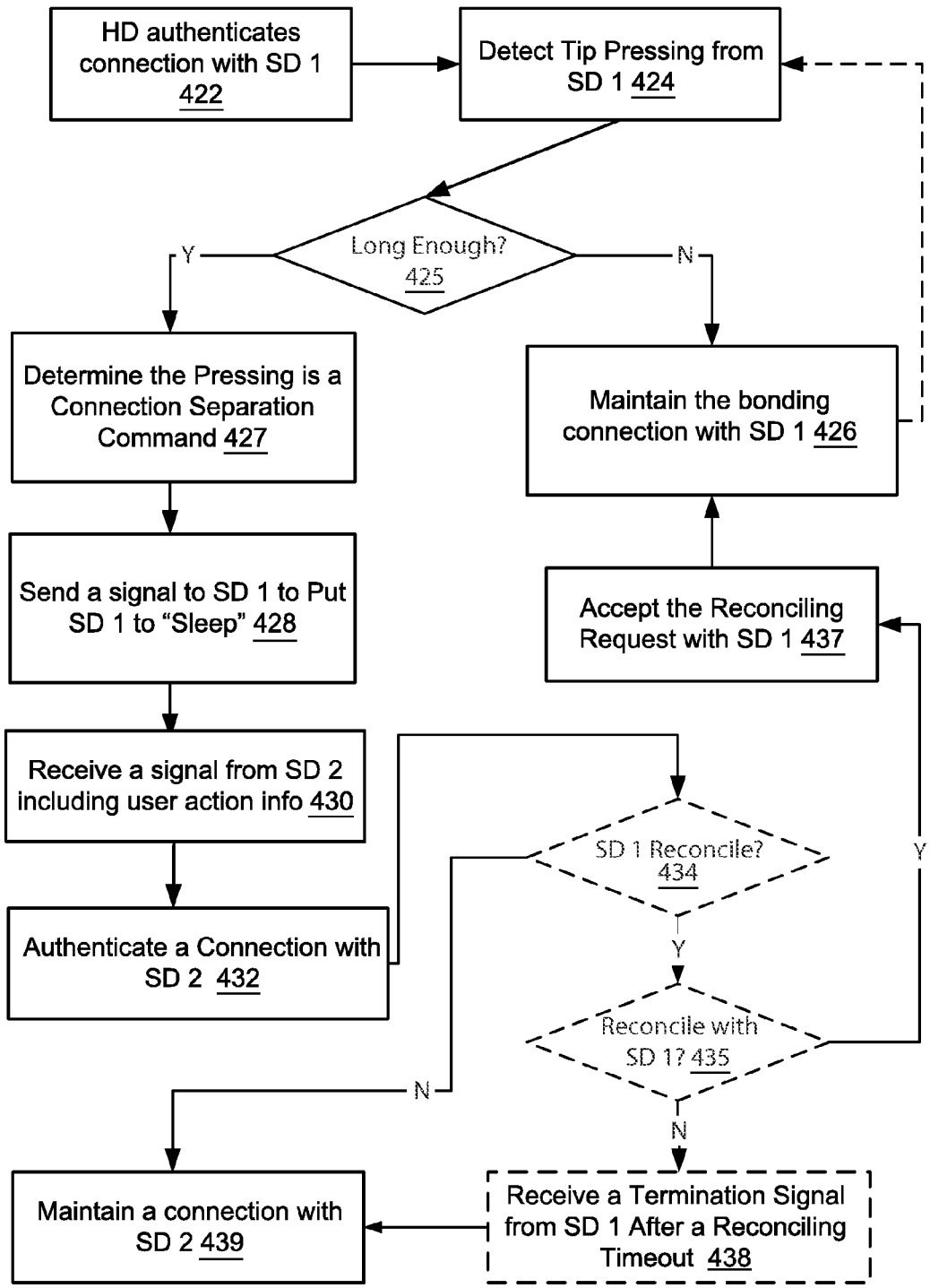
FIG. 4B is a flow chart illustrating a method for a host device to switch from one stylus to another stylus, according to an embodiment.

FIG. 4B is a flow chart illustrating a method for a host device to switch from one stylus to another stylus, according to an embodiment. As shown in FIG. 4B, e.g., continuing on with 414 in FIG. 4A, a host device can authenticate a connection with a first stylus device and maintain being connected with the first stylus device at 422. When a user wants to terminate the connection between the host device and the first stylus device, the user can perform a user action indicating a separation request, e.g., by long-pressing the host device (either with the first stylus device, and/or other objects). The host device may in turn detect a continuously pressing on the surface, at 424.

In some instances, upon detecting a user action at 424, the host device may determine a pattern (e.g., the action type, duration, rhythm, etc.) of the user action and the implication of the pattern, e.g., a long-time press indicates a user command to separate the connection between the host device and the first stylus device. In other example, various patterns of user action, e.g., double-tap, double-shake, and/or the like, may be used to indicate a user command to separate the connection.

At 425, for example, when the pressing time length is long enough (e.g., greater than a predefined threshold such as four seconds, five seconds, etc.), the host device may determine that the pressing is a termination command and/or a connection separation request made by a user, at 427, and thus may in turn send a signal to the first stylus device to put the first stylus device to a "sleep" mode, at 428. In this way, the wireless connection between the first stylus device and the host device is terminated at 428. Otherwise, when the host device senses the pressing time is not long enough (e.g., for less than the predefined threshold, etc.), indicating the pressing may not be a connection termination command (e.g., a user fingertip may accidentally press the host device, etc.), the host device may maintain the wireless connection with the first stylus device at 426, and may optionally monitor the status of the connection until detecting another tip pressing from the first stylus device (e.g., returning to 424).

In some instances, when the host device provisionally separates from the first stylus device at 428, a user can press a second stylus device ("SD 2") to connect the second stylus with the host device. if a second stylus device senses a user action (e.g., press, etc.) and the second stylus device can send a signal to the host device including the user action information, at 430. The host device may authenticate a connection with SD 2, at 432, in a similar manner as discussed in FIG. 4A.

In some instances, when the first device is a passive device, e.g., a stylus, the first device may not attempt to reconcile with the host device when the wireless connection is separated. In other instances, when the first device includes a smart device, the first device may optionally send a reconciling signal at 434 to the host device, e.g., attempt to reconcile and resume the connection with the host device. If a reconciling signal is received at 434, the host device can determine whether to reconcile and resume the connection with the first stylus device at 435. If the host device elects to reconcile at 435, the host device may accept the reconciling request from the first stylus device at 426, and continue to maintain the connection, e.g., at 437. If the host device chooses not to reconcile the bonding connection with the first stylus device at 435, the first stylus device may not receive any response signal from the host device in response to the reconciling request. In this case, the host device may receive a termination signal from the first stylus device after the reconciling timeout (e.g., two seconds, etc.) at 438. If no reconciling signal is received, at 434, or after the reconciling timeout at 438, the host device can establish a bonding connection with the second stylus device at 439, in response to the signal received at 430.

Figure 5:
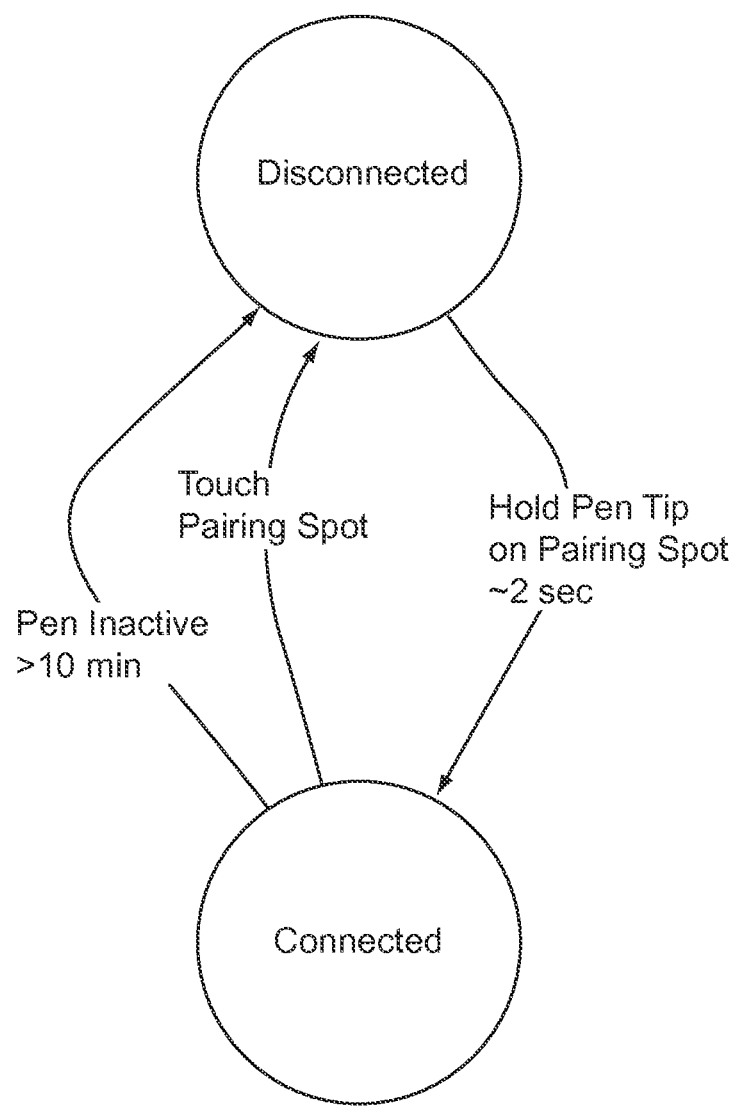
FIG. 5 is a state diagram illustrating a state of pairing and unpairing of a stylus device with a host device, according to an embodiment.

FIG. 5 is a state diagram illustrating a state of pairing and unpairing of a stylus device with a host device, according to an embodiment. Initially, the stylus device (or "pen" as referenced in FIG. 5) and the host device are not wirelessly paired. In some instances, when a user, at a first time, touches (or presses or contacts) the stylus device on the pairing spot of the host device surface for approximately 2 seconds (and subsequently ceases to press the stylus device on the host device surface), the stylus device and the host device become activated and initiate and establish wireless pairing with each other. Touching of the pairing spot of the host device surface by the stylus device at, for example, a second time after the first time can disconnect the two devices (or terminate the wireless pairing between the stylus device and the host device). In other instances, after activation and pairing, if the stylus device is inactive (e.g., not used to write, draw, erase, or perform other functions on the host device) for a pre-determine time level (e.g., >10 min), the wireless pairing between the host device and the stylus devices is automatically terminated (i.e., the stylus device and the host device become disconnected).

The wireless pairing method of the stylus device with the host device shown in FIGS. 1-5 can occur automatically (upon touching or pressing of the stylus device on the host device surface), transparently and securely. Additionally, the method for wireless pairing of the stylus device with the host device as described in FIGS. 1-5 uses an out-of-band communication channel that does not involve the use of an extra radio transceiver in the stylus device and/or the host device, and does not need a user to enter security credentials (e.g., PIN codes) that can be cumbersome and can necessitate display devices and/or keyboards to be included in the stylus device and/or host device. This can simplify stylus device and host device design, reducing manufacturing complexity and expense because incorporation of a second out-of-band radio transceiver is avoided. It should be noted that the stylus device and the host device can perform a variety of different functions under different circumstances before, during or after wireless pairing between the stylus device and the host device. FIGS. 6-18 describe specific examples of the different functionalities of the stylus device in relation to the host device.

Figure 6:
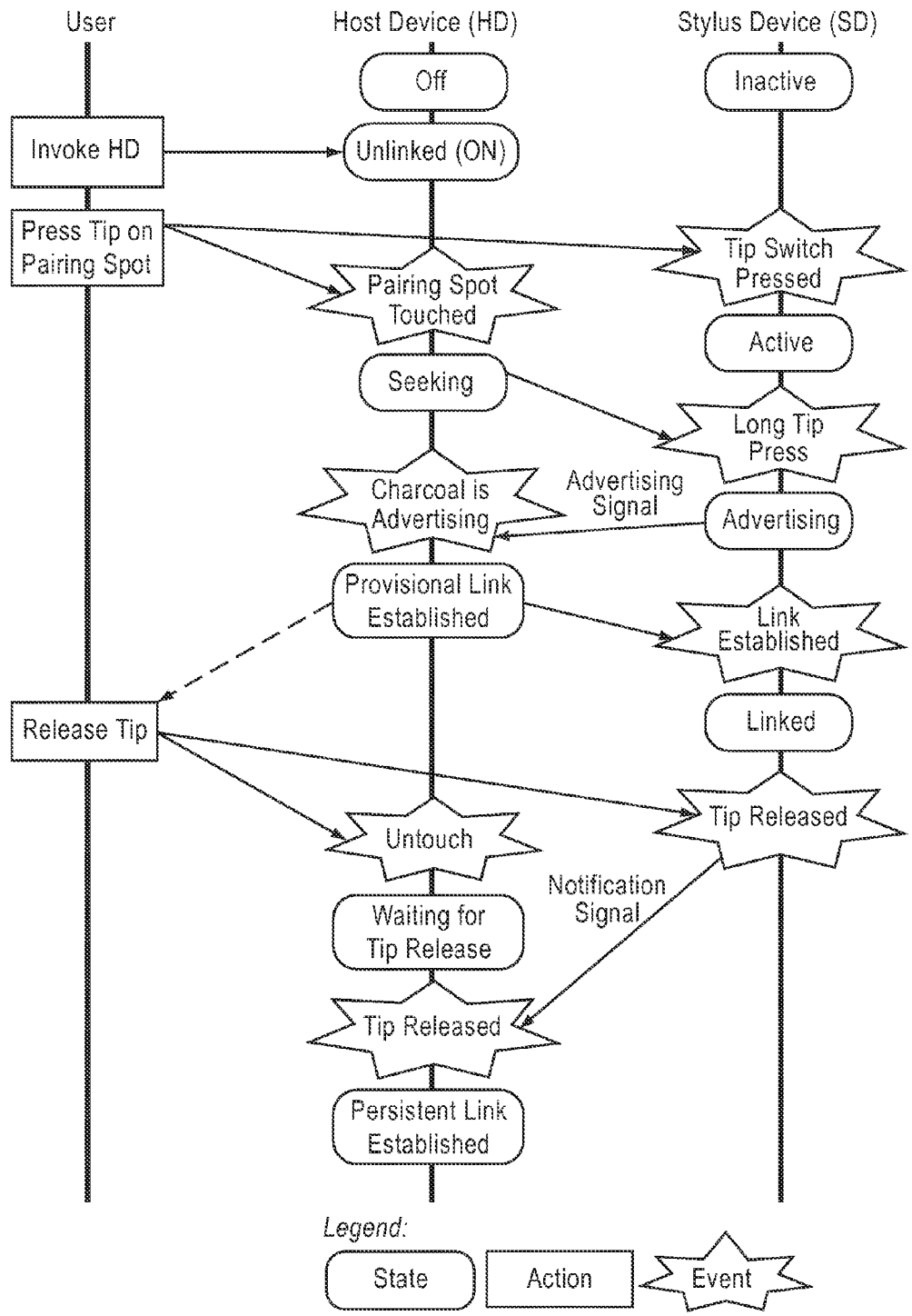
FIG. 6 is a flowchart illustrating a method for initiating and establishing a wireless pairing session between a stylus device and a host device, according to an embodiment.

FIG. 6 is a flowchart illustrating a method for initiating and establishing a wireless pairing session between a stylus device and a host device, according to an embodiment. Initially, the host device (HD) is in an off-state (or turned-off) and the stylus device (SD) is in an inactive state. The method includes a user invoking or turning on the HD. The user can press the tip portion of one end portion of the SD on the pairing spot of the HD screen. Pressing of the SD tip portion on the HD surface activates the switch on the end portion of the SD that is in contact with the HD surface and thus activates the SD. If the SD tip portion is pressed on the HD surface for time period greater than a pre-determined value (a long value, for example, 1 sec<t<10 sec), the SD can enter into an advertising state and send a signal (e.g., an advertising signal as described in FIG. 2) that advertises the presence of the SD to all wireless devices within range of the RF transceiver in the SD.

Upon detecting the pressing of the SD tip portion on the HD, the HD can enter into a seeking state and send a signal to all wireless devices in range of the HD RF transceiver. As described above, detection of the SD tip portion pressing on the HD surface (e.g., screen) is performed by touch sensors operably coupled to the pairing spot on the HD. Once the HD receives the advertising signal from the SD and the SD receives the signal from the HD, a provisional wireless link or connection is established between the HD and the SD and the SD enters into a linked state. When in the provisional linked state, the HD and/or SD can send a signal to the user that alerts the user of the establishment of the provisional linked state (e.g., the turning on or flashing of an LED on the SD and/or the HD). The user can stop pressing the SD tip portion on the pairing spot of the HD surface (e.g., by releasing the SD tip portion). The HD can also independently detect the SD tip release via a signal generated by the touch sensor in the HD (e.g., pressure-off signal as described in FIG. 2). Release of the SD tip portion from the SD surface can invoke the SD to generate and send a signal (e.g., a notification signal as described in FIG. 2) to the HD that informs the HD of the SD tip portion release. If the independent detection by the HD of the tip portion release (via the pressure-off signal) and the receipt by the HD of the notification signal is sufficiently coincident in time (e.g., occurs within a 50 msec window), a persistent wireless link (or connection) can be established between the HD and SD.

Figure 7:
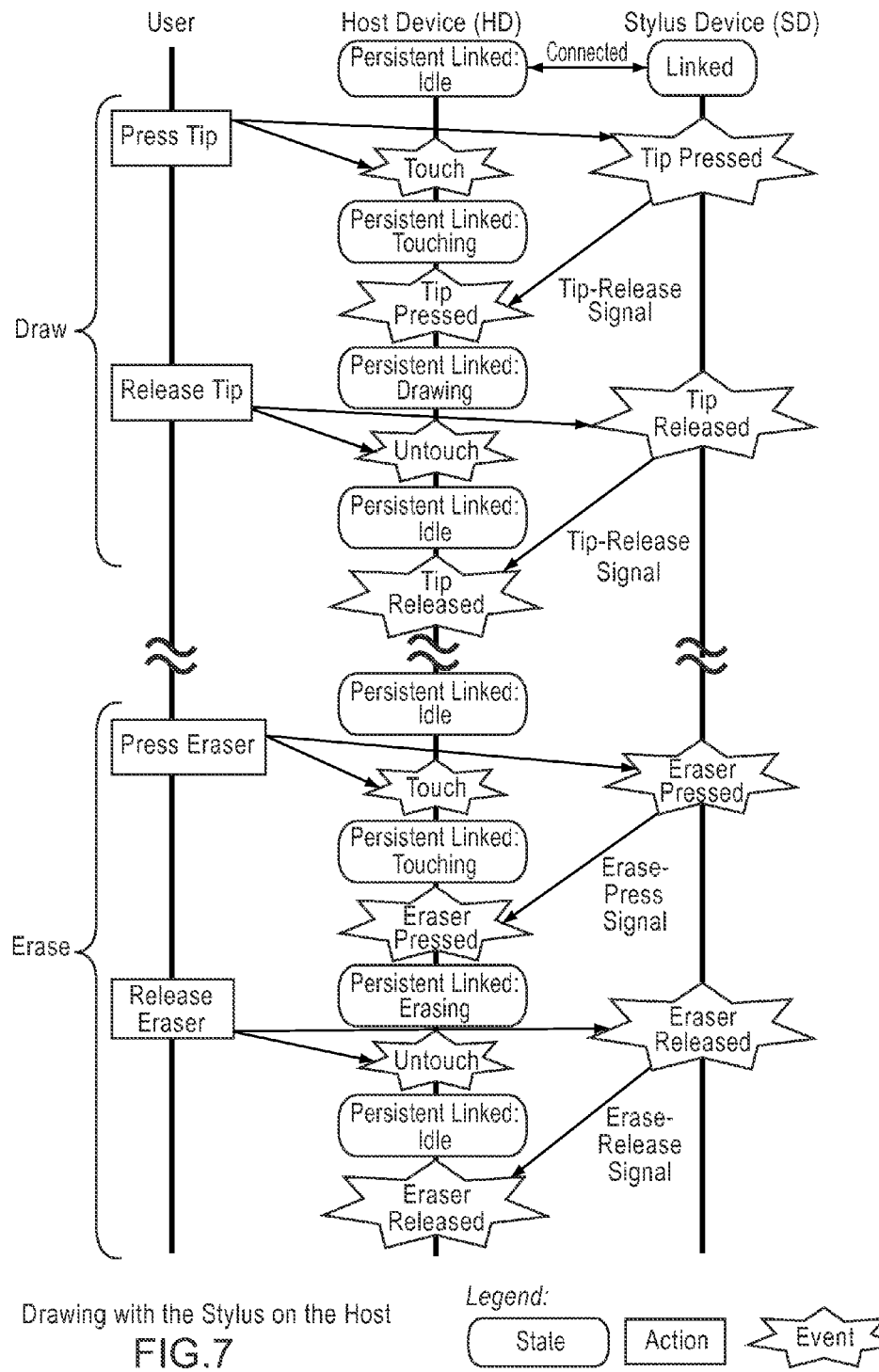
FIG. 7 is a flowchart illustrating a method for a stylus device to actively draw and erase on the surface of a host device, according to an embodiment.

FIG. 7 is a flowchart illustrating a method for a stylus device to actively draw and erase on the surface of a host device, according to an embodiment. The method includes a user operating the SD under an erasing mode and/or a drawing mode, e.g., by using one end portion of the stylus device (SD) for drawing on the host device (HD) and another end portion of the SD for erasing. Initially, the HD is in, for example, an idle mode of the persistent wireless linked state with the SD (the status of the SD is also in the linked state). In such a state, the HD and SD are in the wireless paired mode. The user first presses the tip of one end portion of the SD on the surface of the HD to begin drawing (or writing). Upon detection of contact of the tip portion on the HD surface (as described above), the HD enters into, for example, a touching mode of the persistent wireless linked state. When the SD tip portion is pressed against the HD surface for drawing, the active end portion of the SD can generate and send a signal (e.g., a tip-press signal) to the HD informing the HD about the pressing of the SD tip portion. When the HD receives the tip-press signal (sent from the SD), the HD can enter into, for example, a drawing mode of the persistent linked state with the SD. Upon completion of drawing of the desired pattern on the HD surface, the user can release the SD tip portion from the surface of the HD. The SD and HD can both detect the release of the SD tip from the surface of the HD. Upon detection of the tip release from the HD surface, the HD can enter into, for example, an idle mode of the persistent wireless linked state with the SD. The SD can also send a signal to the HD that informs the HD about the SD tip portion release. In this way, the HD can capture movement data from the surface of the HD representing a drawing line, in response to the SD moving on the surface when the user operates the SD to "draw" on the surface of the HD.

In some instances, the user can switch the end portion of the SD and press the tip portion associated with a second end portion of the SD on the surface of the HD for erasing. Upon detection of contact of the tip portion on the HD surface as described above, the HD enters into, for example, a touching mode of the persistent wireless linked state. When the SD tip portion is pressed against the HD surface for erasing, the second end portion of the SD is activated and the activated end portion of the SD can generate and send to the HD a signal (e.g., an eraser-press signal) informing the HD about the pressing of the eraser end portion of the SD. When the HD receives the eraser-press signal (sent from the SD), the HD can enter into, for example, an erasing mode of the persistent linked state with the SD. After the desired erasing function of the SD is completed, the user can release the eraser end portion of the SD from the surface of the HD. The SD and HD can both detect the release of eraser end portion of the SD from the surface of the HD. Upon detection of the release of the eraser end portion of the SD from the HD surface, the HD can enter into, for example, an idle mode of the persistent wireless linked state with the SD. The SD can also send to the HD a signal (e.g., an eraser-release signal) that informs the HD about the release of the eraser end portion from the HD surface. In this way, the HD can capture movement data from the surface of the HD representing an erasure line, in response to the SD moving on the surface when the user operates the SD to "erase" on the surface of the HD.

Figure 8:
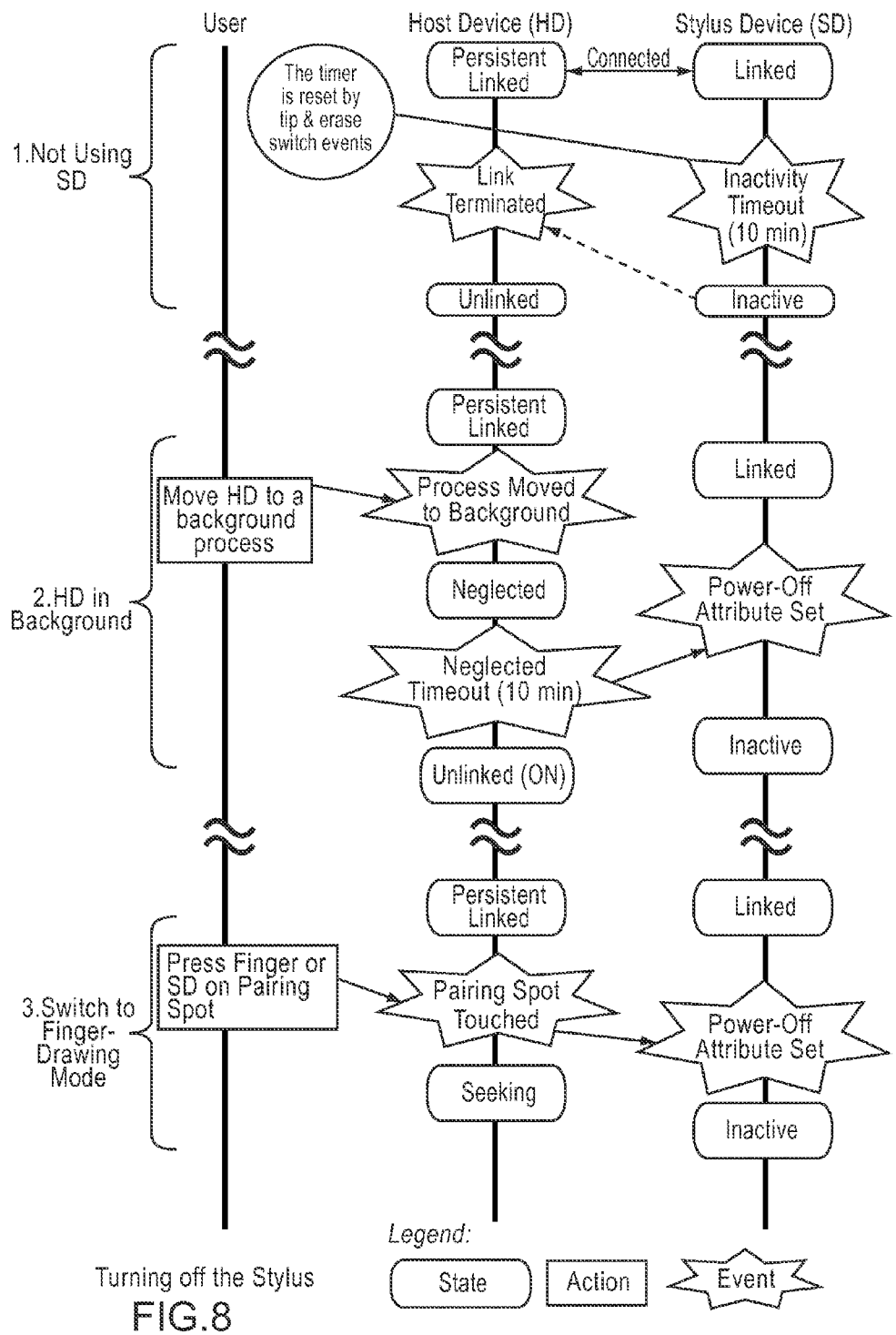
FIG. 8 is a flowchart illustrating a method for a stylus device being sent into an inactive state during a first instance, a second instance and a third instance.

FIG. 8 is a flowchart illustrating a method for a stylus device being sent into an inactive state during a first instance, a second instance and a third instance. In the first instance, the HD is initially in a persistent linked state with the SD (the SD is also in the linked state) and the SD is not being used to perform any functions on the HD (e.g., draw, write, erase, shading, etc.). In such instances, both the HD and the SD can include timer circuitry (or functionality) that can monitor the time between different activities performed by the SD and HD and can also track inactivity time. The timer circuitry in the SD and HD can also be reset by each action performed with the tip portions of the SD. Such timer circuitry can be based on, for example, the switch on each end portion of the SD and the touch sensors of the HD. When the SD is not performing any active tasks longer than a pre-determined time period (e.g., >10 min), the timer circuitry in the SD can send a timeout signal and send the SD into an inactive state. This can lead to the termination of the persistent linked state with the HD (end of wireless pairing with HD) and the HD also enters into an unlinked state.

In the second instance, the HD is initially in a persistent linked state with the SD (the SD is also in the linked state), and the HD process or application that is communication with the SD is moved to the background. In such instances, if no active tasks are performed on the HD for a time period longer than a pre-determined time period (e.g., >10 min) (the HD process or application is neglected), the timer circuitry in the HD can send a timeout signal that takes the HD into an unlinked state (the HD is still turned on). The timer circuitry in the HD can also send a timeout signal to the SD that can engage the powering-off mechanism of the SD and can send the SD into an inactive state.

In the third instance, the HD is initially in a persistent linked state with the SD (the SD is also in the linked state), and the user switches to a finger-drawing mode (from an SD-drawing mode). In such instances, the user can press a finger or an SD tip portion on the pairing spot on the HD surface. As described in FIG. 5, the pressing of pairing spot when the HD and SD are already in the persistent linked state can disconnect the two devices (or terminate the persistent linked state of the SD with the HD). This can send the HD into the seeking state (in which the HD can search for new wireless devices with which to pair) and can also invoke the powering-off mechanism of the SD and send the SD into an inactive state.

Figure 9:
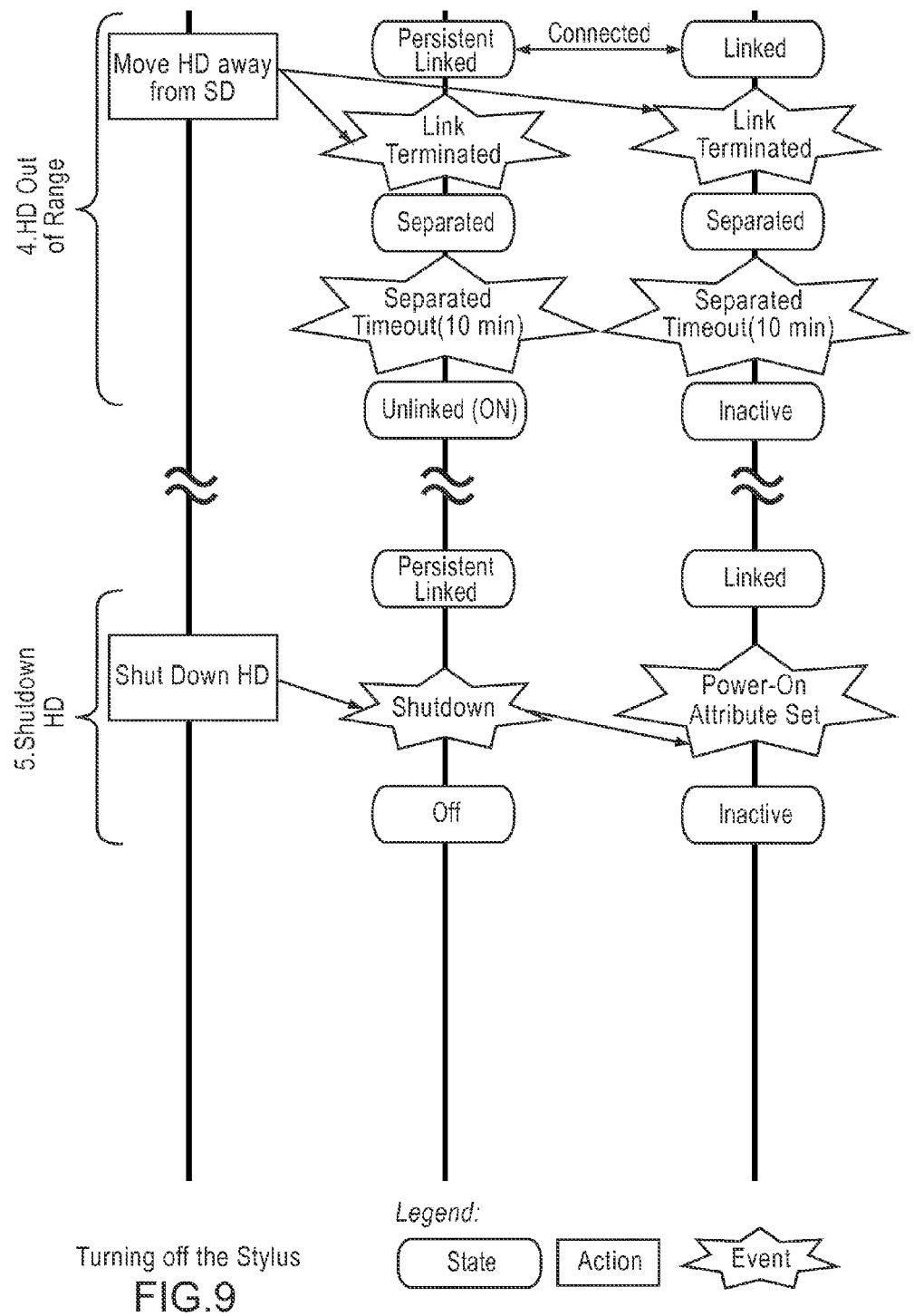
FIG. 9 is a flowchart illustrating a method for a stylus device being sent into an inactive state during a fifth instance and a sixth instance.

FIG. 9 is a flowchart illustrating a method for a stylus device being sent into an inactive state during a fifth instance and a sixth instance. In the fourth instance, the HD is initially in a persistent linked state with the SD (the SD is also in the linked state), and a user can move the HD and the SD out of range of each other. In such instances, the HD and SD are moved out of range of each of their respective RF transceivers such that wireless data can neither be sent nor received between the SD and the HD. In such instances, the persistent link between SD and the HD is terminated and the SD and HD each can enter into, for example, a separated state. If the link between the SD and HD remains terminated for longer than a pre-determined value (e.g., >10 min) based on the output of the timing circuitry included in each of the devices, the HD is brought into the unlinked state (but is not powered-off) and the SD is sent into the inactive state.

In the fifth instance, the HD is initially in a persistent linked state with the SD (the SD is also in the linked state), and the HD is shut down or powered-off by a user. In such instances, the persistent link between the SD and HD is terminated and the HD is shut down or powered-off. This event can also invoke the powering-off mechanism of the SD and send the SD into an inactive state.

Figure 10:
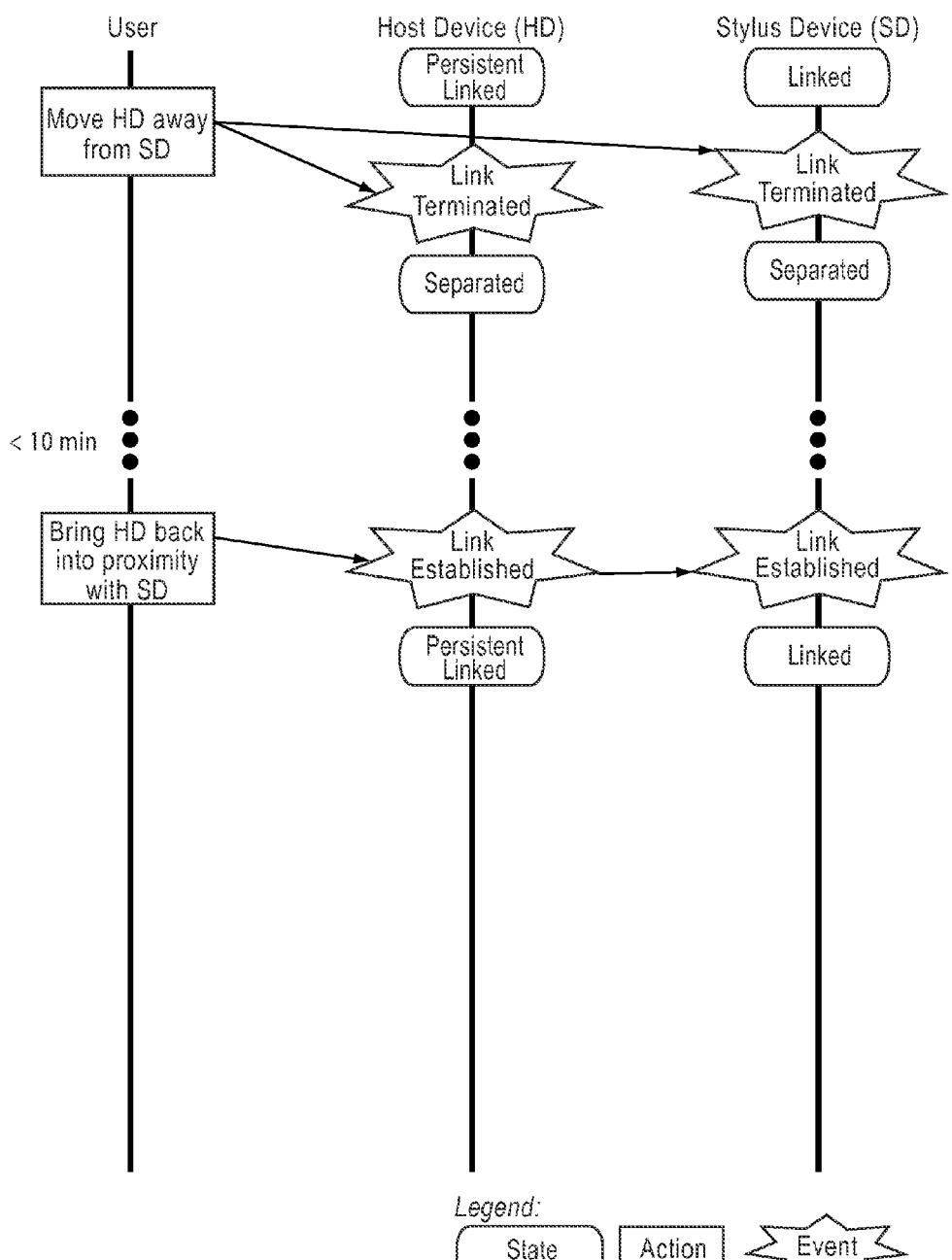
FIG. 10 is a flowchart illustrating a method for the unpairing and pairing of a stylus device with a host device as the host device goes out-of-range of the stylus device and returns back into range.

FIG. 10 is a flowchart illustrating a method for the unpairing and pairing of a stylus device with a host device as the host device goes out-of-range of the stylus device and returns back into range. Initially, the HD is in a persistent linked state with the SD (the SD is also in the linked state). The user first moves the HD away from SD such that the HD and SD are moved out of range of each of their respective RF transceivers. In such instances, data cannot be exchanged wirelessly between the SD and the HD. The persistent link between SD and the HD is terminated and the SD and HD each can enter into, for example. a separated state. The user then brings the HD back into proximity of the SD before the expiration of a pre-determined time limit that can induce permanent termination of wireless pairing (e.g., t<10 min). In such instances, the wireless link between the HD and SD can be re-established and the HD can return to the persistent linked state with the SD (the SD also returns to the linked state).

Figure 11:
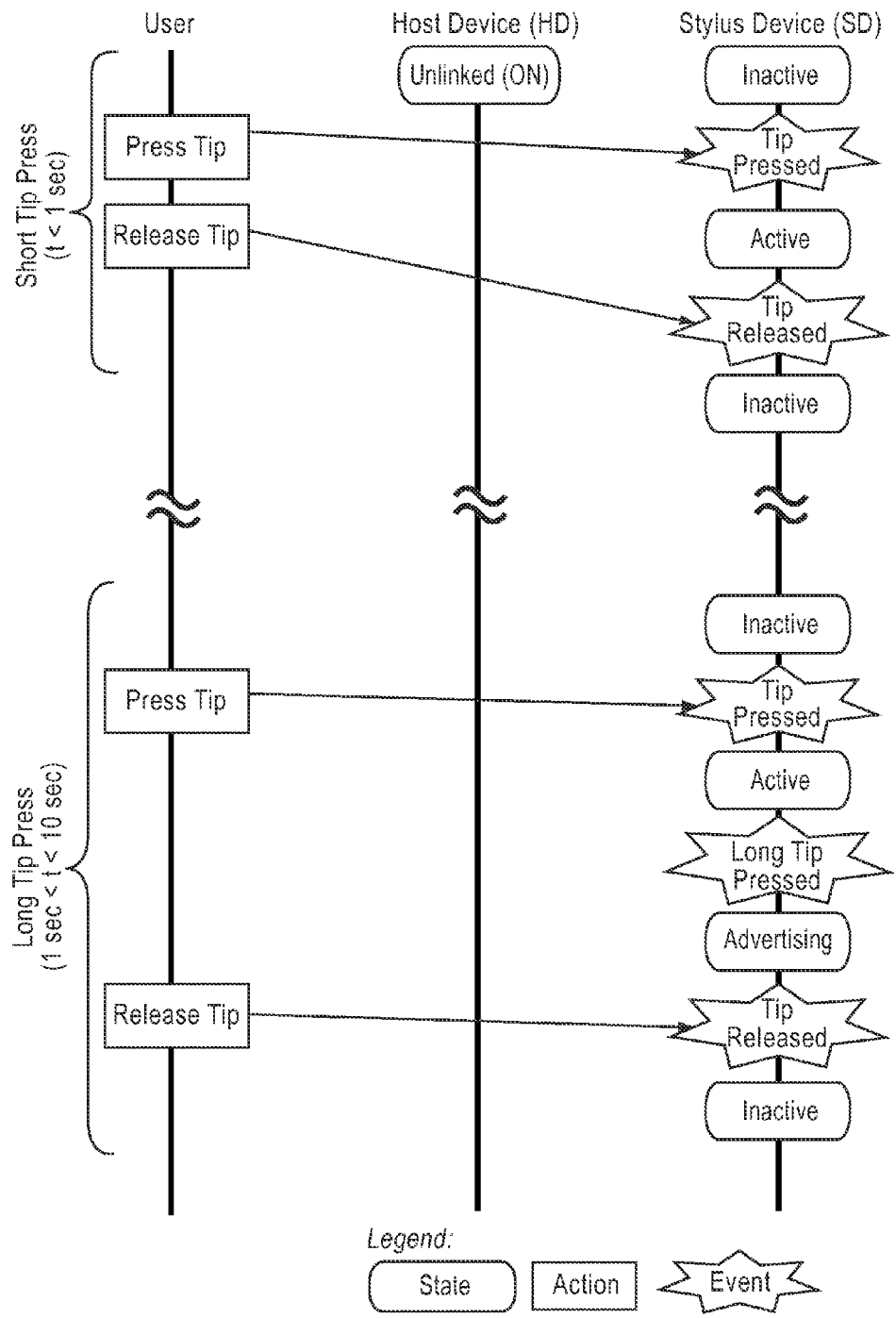
FIG. 11 is a flowchart illustrating a method for the accidental turn-on of the stylus device during a first instance and a second instance.

FIG. 11 is a flowchart illustrating a method for the accidental turn-on of the stylus device during a first instance and a second instance. In the first instance, the SD tip portion is accidentally pressed against the HD surface for a pre-determined short time period (e.g., <1 sec). In such instances, initially the HD is in an unlinked state and the SD is in an inactive state. As the user accidentally presses the tip of one end portion of the SD on the HD surface (not on the pairing spot), the switch on the end portion of the SD that is pressed against the HD is activated and can send a signal to send the SD into the active state. Because the SD tip portion was not pressed against the pairing spot of the HD surface, the HD remains in the unlinked state. The user can release the SD tip portion from the HD surface after a short tip press (e.g., <1 sec), and the SD can detect the release of the tip portion. Additionally, because the SD does not receive a signal from the HD, no tip-release signal is sent to the HD and thus no provisional or persistent link can be formed between the HD and the SD (i.e., no wireless pairing), and the SD returns to the inactive state.

In the second instance, the SD tip portion is accidentally pressed against the HD surface for a pre-determined long time period (e.g., between 1 sec and 10 sec). In such instances, initially the HD is in an unlinked state and the SD is in an inactive state. As the user accidentally presses the tip portion of one end of the SD on the HD surface (not on the pairing spot), the switch on the end portion of the SD that is pressed against the HD is activated and can send a signal to send the SD into the active state. Because the SD was not pressed against the pairing spot of the HD surface, the HD remains in the unlinked state. In such instances, because the SD tip portion is pressed on the HD surface for a pre-determined long time period time period (e.g., between 1 sec and 10 sec), the SD can enter into the advertising state and can generate and send a signal (e.g., an advertising signal as described in FIG. 2) that advertises the presence of the SD to all wireless devices within range of the RF transceiver in the SD. The HD, however, is still in the unlinked state and so no provisional or persistent link can be formed between the HD and the SD (i.e., no wireless pairing). The user can release the SD tip portion from the surface of the HD and the SD can detect the release of the SD tip portion. This can de-activate the switch on the SD tip portion and can send the SD into the inactive state.

Figure 12:
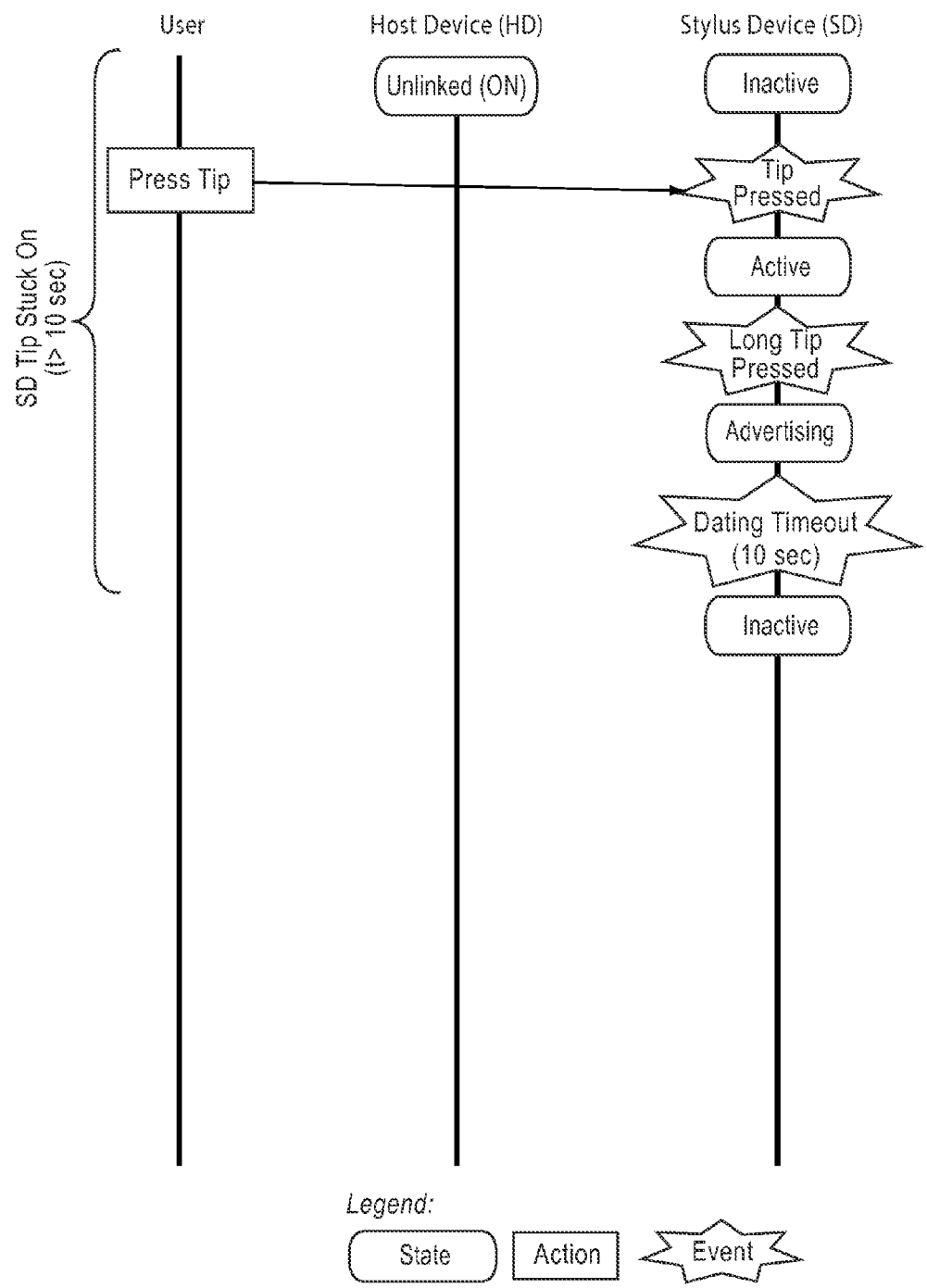
FIG. 12 is a flowchart illustrating a method for the accidental turn-on of the stylus device during a third instance.

FIG. 12 is a flowchart illustrating a method for the accidental turn-on of the stylus device during a third instance. In the third instance, the SD tip portion is accidentally pressed on the HD surface (not on the pairing spot of the HD) and stuck on the HD surface (e.g., >10 sec). In such instances, initially the HD is in an unlinked state and the SD is in an inactive state. As the user accidentally presses the tip portion of one end of the SD on the HD surface (not on the pairing spot), the switch on the end portion of the SD that is pressed against the HD surface is activated and can send a signal to send the SD into the active state. Because the SD tip portion was not pressed against the pairing spot of the HD surface, the HD remains in the unlinked state. Because the SD tip portion is stuck on the HD surface (i.e., pressed against the HD surface for time periods greater than 10 sec), the SD can enter into the advertising state and can generate and send a signal (e.g., an advertising signal as described in FIG. 2) that advertises the presence of the SD to all wireless devices within range of the RF transceiver in the SD. The HD, however, is still in the unlinked state and so no provisional or persistent link can be formed between the HD and the SD (i.e., no wireless pairing). Additionally, the timer circuitry in the SD can detect that the SD tip portion is pressed or stuck on the HD surface longer than a pre-determined time period (e.g., >10 sec) and can generate a timeout signal to return the SD into an inactive state.

Figure 13:
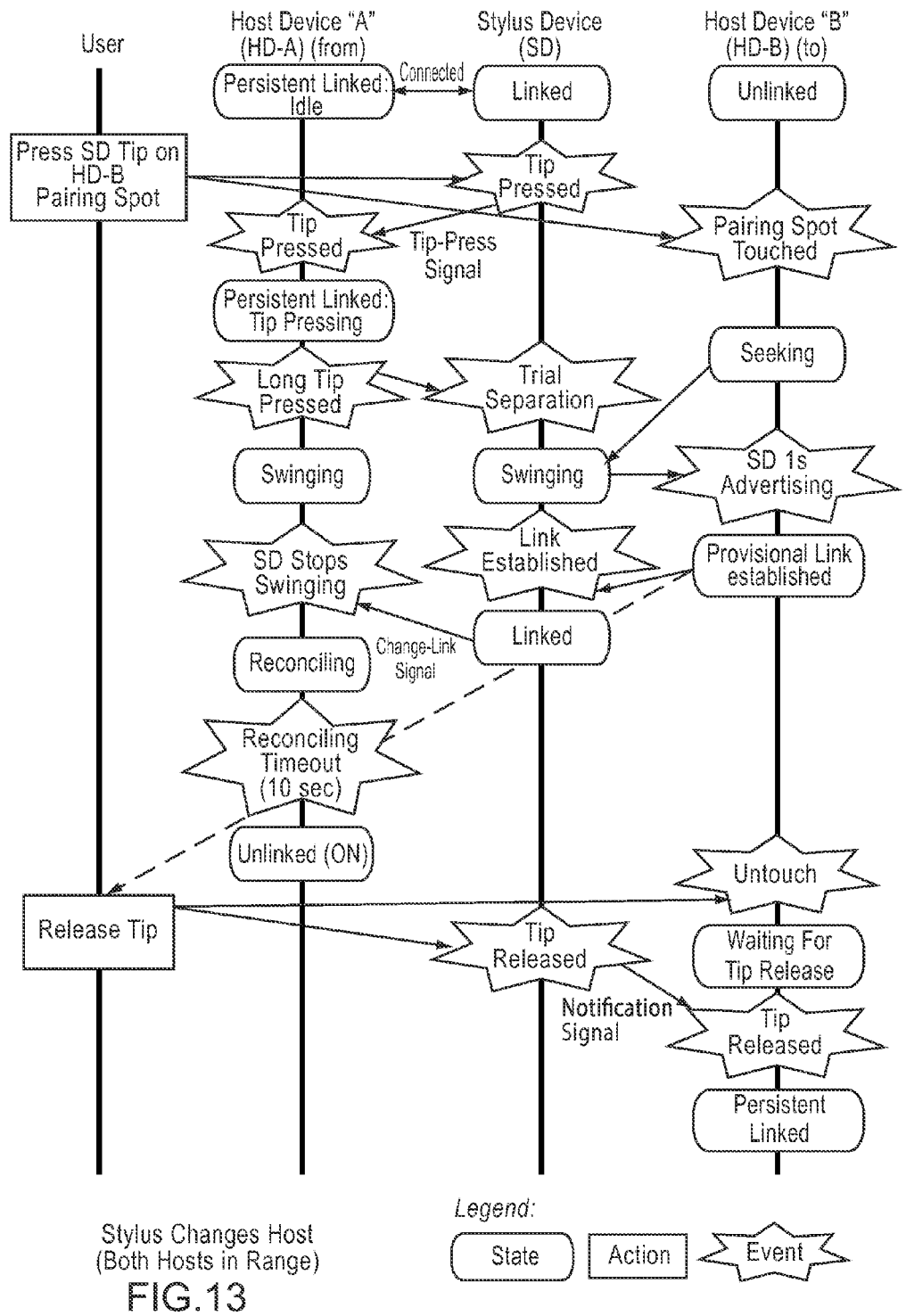
FIG. 13 is a flowchart illustrating a method for switching host devices with respect to a stylus device where both the host devices are within range of the stylus device, according to an embodiment.

FIG. 13 is a flowchart illustrating a method for switching host devices with respect to a stylus device where both the host devices are within range of the stylus device, according to an embodiment. Initially, the first host device (HD-A) is in, for example, an idle mode of the persistent wireless linked state with the SD (the status of the SD is also in the linked state). In such a state, the HD-A and SD are in the wireless paired mode. A user then presses the tip portion of the SD on the pairing spot of a second host device (HD-B). Because both HD-A and HD-B are within the range of the SD and SD is already in a linked state with HD-A, detection of the pressing of the SD tip portion on the pairing spot of HD-B can lead the SD to generate and send to both HD-A and HD-B a signal (e.g., a tip-press signal) informing HD-A and HD-B about the pressing (or activation) of the SD tip portion. HD-A can receive the tip-press signal from the SD and enter into, for example, a tip-pressing mode of the persistent linked state with the SD. Simultaneously, HD-B can also independently detect the pressing of the SD tip on the HD-B pairing spot and can enter into, for example, a seeking state. In the seeking state, HD-B can send a signal to detect all wireless devices within range. The touch sensor in HD-A, however, does not detect the pressing or contact of the SD tip on the HD-A surface. If the SD tip is pressing against the pairing spot of HD-B for a pre-determined long time period (e.g., between 1 sec and 10 sec) and is not pressing on the HD-A surface, HD-A can enter into, for example, a swinging state and send a signal (e.g., a trial separation signal) to the SD to initiate a termination of the persistent linked state with the SD. Reception of the trial separation signal from HD-A can send the SD into a swinging state.

The SD, however, also receives the signal from HD-B and can thus enter into a provisional linked state with HD-B. On establishing a provisional linked state with HD-B, the SD can exit the swinging state and send a signal to HD-A (e.g., a change-link signal) that informs HD-A about the new provisional linked state established between SD and HD-B. HD-A can receive the change-link signal from SD and can enter into, for example, a reconciling state. If the SD tip portion is not in contact with the surface of SD-A longer than a pre-determined time period (e.g., >10 sec), the timer circuitry in HD-A can send a signal (i.e., reconciling timeout signal) to terminate the persistent link between HD-A, and SD and HD-A can enter into an unlinked state. Once the provisional linked state is established between SD and HD-B, SD can send a signal that can alert the user of the establishment of the provisional linked state between HD-B and SD. The user can then release the SD tip portion from the pairing spot on the HD-B surface. HD-B can independently detect the release of the SD tip portion from the pairing spot (e.g., via signal from the touch sensors in HD-B) and can wait to receive a signal (e.g., a notification signal) from SD. The SD can detect the release of the SD tip from HD-B pairing spot and can a signal (e.g., a notification signal) to HD-B informing HD-B of the release of the tip portion of the SD. HD-B can receive the notification signal from SD and can process the timing information associated with the two signals (that represent the release of the SD tip portion from the HD-B pairing spot) to determine their time-coincidence. If the two signals are sufficiently coincident in time (e.g., occur within a 50 msec window), a persistent wireless link (or connection) can be established between the HD-B and SD.

Figure 14:
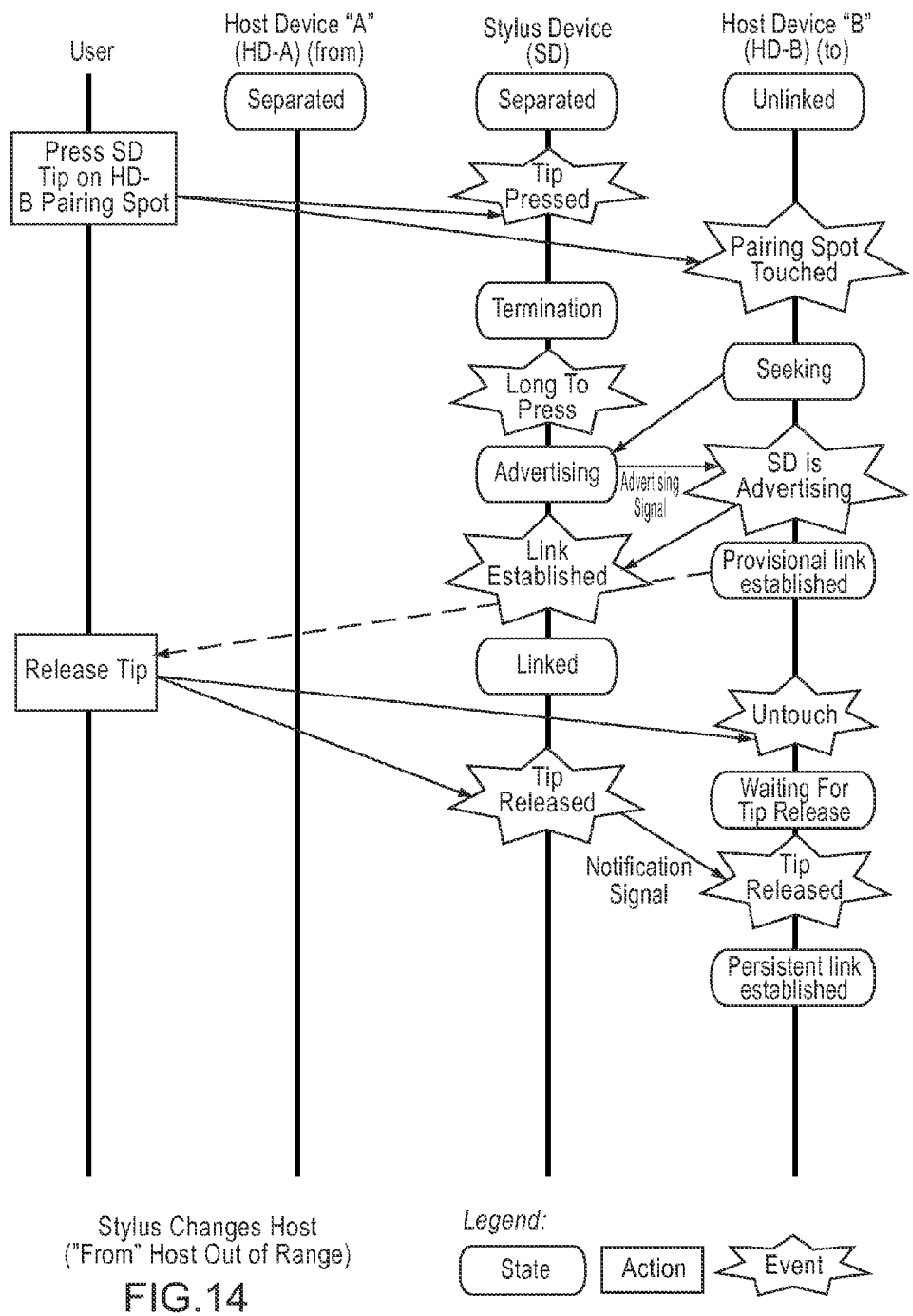
FIG. 14 is a flowchart illustrating a method for switching host devices with respect to a stylus device where a first host device is moved or taken out of the range of the stylus device and a second host device is within range of the stylus device, according to an embodiment.

FIG. 14 is a flowchart illustrating a method for switching host devices with respect to a stylus device where a first host device is moved or taken out of the range of the stylus device and a second host device is within range of the stylus device, according to an embodiment. Switching the host device can include an instance when the first host device (HD-A) is moved or taken out of range of the SD by a user and brought into proximity (within range) of a second host device (HD-B). In such instances, any wireless pairing (e.g., provisional and/or persistent links) between HD-A and SD will undergo termination such that HD-A and SD are in a separated state (that can initiate the process of termination of the wireless paining between HD-A and SD); the HD-B is also in an unlinked state. The user then presses the tip portion of the SD on the pairing spot of HD-B. Detection of the press of the SD tip portion on the surface of HD-B can send SD into, for example, a termination state where SD is permanently terminating the wireless pairing with HD-A.

Simultaneously, HD-B can also independently detect the pressing of the SD tip portion on the HD-B pairing spot and can enter into, for example, a seeking state. In the seeking state, HD-B can send a signal to detect all wireless devices within range. If the SD tip portion is pressing against the pairing spot of HD-B for a pre-determined long time period (where a long time period can be defined to be, for example, anywhere between 1 sec and 10 sec), the SD detects the tip pressing event and enters into an advertising state where the SD can send a signal (e.g., an advertising signal as described in FIG. 2) that advertises the presence of the SD to all wireless devices within range of the RF transceiver in the SD. HD-B can establish a provisional link with SD and the SD can enter in a linked state. As described above, once the provisional linked state is established between SD and HD-B, SD and/or HD-B can send a signal that can alert the user of the establishment of the provisional linked state between HD-B and SD. The user can then release the SD tip portion from the pairing spot on the HD-B surface. HD-B can independently detect the release of the SD tip portion from the pairing spot (e.g., via a signal(s) from the touch sensors in HD-B) and can wait to receive a signal from the SD. The SD can detect the release of the SD tip portion from the HD-B pairing spot and can a signal to HD-B (e.g., a notification signal) informing HD-B of the tip release. HD-B can receive the notification signal from the SD and can process the timing information associated with the two signals (that represent the release of the SD tip portion from the HD-B pairing spot) to determine their time-coincidence. If the two signals are sufficiently coincident in time (e.g., occur within a 50 msec window), a persistent wireless link (or connection) can be established between the HD-B and SD.

Figure 15:
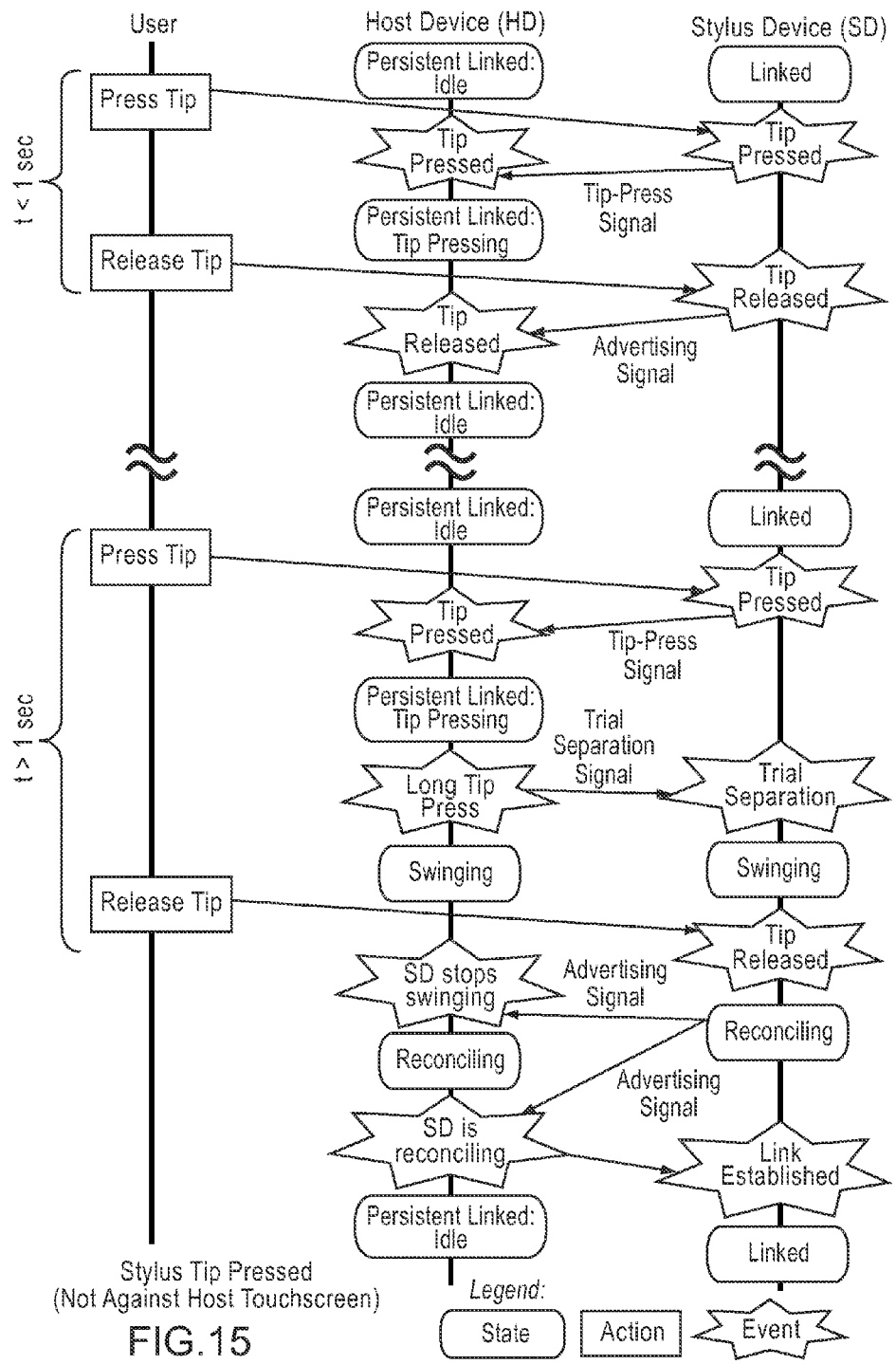
FIG. 15 is a flowchart illustrating the device states when a stylus device is pressed on a surface that is not part of a host device, according to an embodiment.

FIG. 15 is a flowchart illustrating the device states when a stylus device is pressed on a surface that is not part of a host device, according to an embodiment. Initially, the HD is in, for example, an idle mode of the persistent (wireless) linked state with the SD (the status of the SD is also in the linked state). In such a state, the HD and SD are in the wireless paired mode. The user first presses a tip portion of the SD on the surface that is not part of HD (or, for example, any other legitimate host device that can communicate with SD). In response, the SD can generate and send a signal (e.g., a tip-press signal) to the HD informing the HD about the pressing of the SD tip portion (because the HD and SD are in a persistent linked state). Detection of the tip-press signal by the HD can send the HD into, for example, a tip-pressing mode of the persistent linked state with the SD. In some instances, the user can release the SD tip portion from the (non-HD) surface after a first pre-determined time period (where the first pre-determined time period can be defined to be, for example, less than 1 sec), and the SD can detect the release of the tip portion of the SD. The SD can detect the release of the tip portion of the SD (due to de-activation of the SD switch) and can generate and send a signal (e.g., a tip-release signal) to the HD informing the HD about the release of the SD tip portion from non-HD surface (because HD and SD are in a persistent linked state). The HD can receive the tip-release signal from the SD and can go into, for example, an idle mode of the persistent linked state with the SD.

In other instances, the user presses the SD tip portion on the non-HD surface for a second pre-determined time period as shown in FIG. 15 (where a second pre-determined time period can be defined to be, for example, greater than 1 sec). In such instances, because HD does not detect pressure from SD on its surface for the second time period (e.g., >1 sec), the HD and can enter into, for example, a swinging state and send a signal (e.g., a trial separation signal) to the SD to initiate a termination of the persistent linked state with the SD. Reception of the trial separation signal from the HD can send the SD into, for example, a swinging state (that processes the termination of the persistent link with the HD). The user can then release the SD tip portion from pressing or touching on the non-HD surface. Detection of the release of the tip portion of the SD by the SD can send the SD into, for example, a reconciling state and the SD can send, in some instances, periodic tip-release signals to the HD. The HD can accept the first tip-release signal from the SD (that informs the HD that the SD has left the swinging state) and can also enter, for example, into a reconciling state. The SD tip portion continues to not be in contact with the non-HD surface and can send periodic tip-release signals to the HD. The HD can detect the periodic tip-release signals from SD and can re-establish the persistent linked state with the SD.

Figure 16:
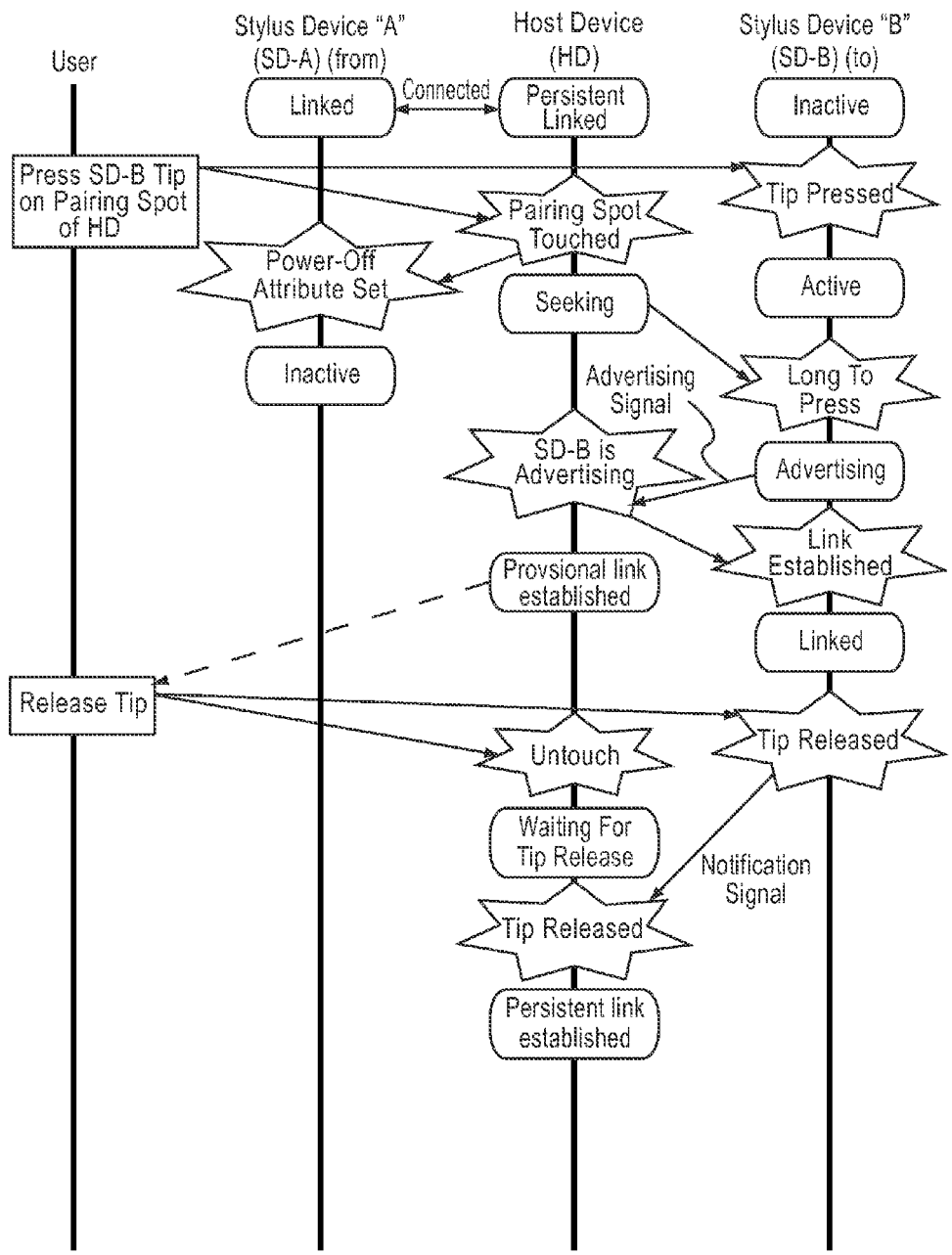
FIG. 16 is a flowchart illustrating a method for switching stylus devices with respect to a host device where both the stylus devices are within range of the host device, according to an embodiment.

FIG. 16 is a flowchart illustrating a method for switching stylus devices with respect to a host device where both the stylus devices are within range of the host device, according to an embodiment. Initially, the first stylus device (SD-A) is in, for example, persistent wireless linked state with the HD, SD-B is in the inactive state, and both SD-A and SD-B are within the range of the HD. A user then presses the tip portion of a second stylus device (SD-B) on the pairing spot of HD. Detection of the pressing of the SD-B tip portion on the pairing spot of HD can activate SD-B. Additionally, the HD can also independently detect pressing of the SD-B tip portion on the surface of the HD and can enter into, for example, a seeking state. In the seeking state, the HD can send a signal to detect all wireless devices within range. Because SD-A is not pressing against or in contact with the pairing spot of the HD, the switches in SD-A are not activated. If the switches in SD-A remain de-activated longer than a pre-determined time period (e.g., between 1 sec and 10 sec), the SD-A can enter into an inactive state. Similarly, if the SD-B tip portion is pressed against the pairing spot of the HD for a relatively long pre-determined time period (e.g., between 1 sec and 10 sec), the SD-B can enter into an advertising state. In the advertising state, the SD-B can send a signal (e.g., an advertising signal as described in FIG. 2) that advertises the presence of the SD-B to all wireless devices within rage of the RF transceiver in the SD-B. SD-B can detect the seeking signal sent from the HD and the HD can detect the advertising signal sent from the SD-B, and thus the HD can establish a provisional link with SD-B (SD-B can enter in a linked state).

The HD and/or the SD-B can send a signal to the user that can alert the user of the establishment of the provisional link state between the SD-B and the HD. The user can release the tip portion of SD-B from the pairing spot on HD. HD can independently detect the release of the SD-B tip portion from the pairing spot (e.g., via a signal(s) from the touch sensors in the HD) and can wait to receive a signal (e.g., a notification signal) from SD-B. The SD-B can detect the release of the SD-B tip portion from the HD pairing spot and can send a signal (e.g., a notification signal) to HD that informs HD of the release of the tip portion of SD-B. HD can receive the notification signal from SD-B and can process the timing information associated with the two signals (that represent the release of the SD-B tip portion from the HD pairing spot) to determine their time-coincidence. If the two signals are sufficiently coincident in time (e.g., occur within a 50 msec window), a persistent wireless link (or connection) can be established between the HD and SD-B.

Figure 17:
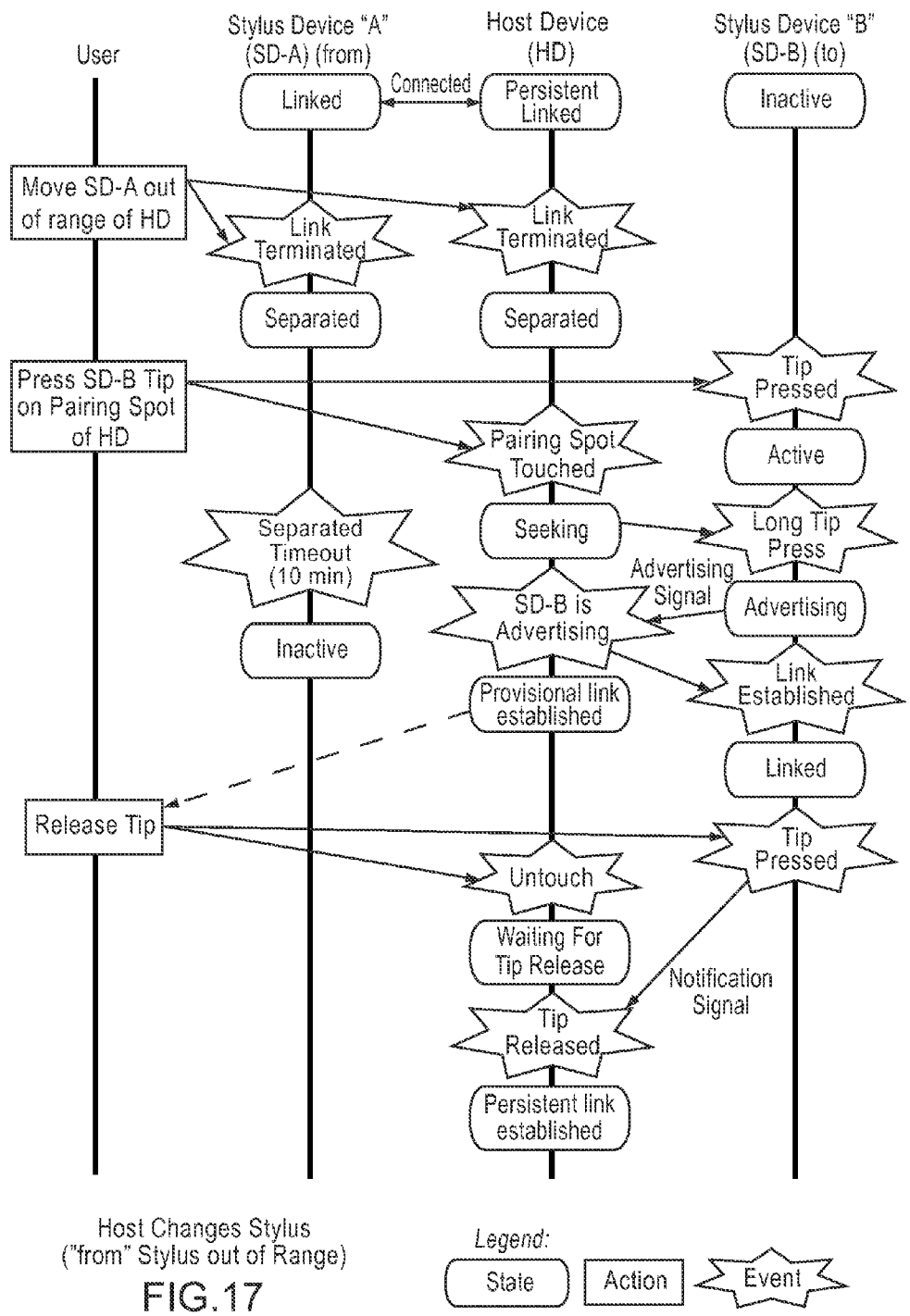
FIG. 17 is a flowchart illustrating a method for switching stylus devices with respect to a host device where a first stylus device is moved or taken out of the range of the host device and the second stylus device is within range of the host device, according to an embodiment.

FIG. 17 is a flowchart illustrating a method for switching stylus devices with respect to a host device where a first stylus device is moved or taken out of the range of the host device and the second stylus device is within range of the host device, according to an embodiment. Initially, the first stylus device (SD-A) is in, for example, a persistent wireless linked state with the HD (wireless pairing), SD-B is in the inactive state, and both SD-A and SD-B are within the range of the HD. Switching the stylus device can involve a first stylus device (SD-A) being moved or taken out of range of the HD by a user, and a second stylus device (SD-B) is brought into proximity to the HD by the user. In such instances, the persistent linked state (any wireless pairing) between SD-A and HD will undergo termination and SD-A and HD can enter into, for example, a separated state (that can initiate and execute the process of termination of the wireless paining between SD-A and HD). The user then presses the tip of an end portion of the second stylus device (SD-B) on the pairing spot of HD. Detection of the pressing of the SD-B tip portion on the pairing spot of HD can activate SD-B. Additionally, HD can also independently detect pressing or contact of the SD-B tip portion on the surface of the HD and can enter into, for example, a seeking state. In the seeking state, the HD can send a signal to detect all wireless devices within range.

If the SD-B tip portion is pressed or makes contact against the pairing spot of the HD for a relatively pre-determined long time period (e.g., between 1 sec and 10 sec), SD-B can enter into an advertising state. In the advertising state, SD-B can send a signal (e.g., an advertising signal as described in FIG. 2) that advertises the presence of the SD-B to all wireless devices within range of the RF transceiver in the SD-B. The SD-B can detect the seeking signal sent from the HD and the HD can detect the advertising signal sent from the SD-B, and thus HD can establish a provisional link with SD-B (SD-B enters into a linked state). Because SD-A is out-of-range of the HD and is not pressing against or in contact with the pairing spot of the HD, the switches in SD-A are not activated. If the switches in SD-A remain de-activated for longer than a pre-determined time period (e.g., >10 min), the timing circuitry in SD-A can send a signal to permanently terminate the persistent link with HD and send SD-A into an inactive state.

Upon establishment of the provisional link between SD-B and HD, HD and/or SD-B can send a signal to the user that can alert the user of the establishment of the provisional link. The user can release the tip portion of SD-B from the pairing spot on HD. HD can independently detect the release of the SD-B tip portion from the pairing spot (e.g., via a signal from the touch sensors in HD) and can wait to receive a signal (e.g., a notification signal) from SD-B. The SD-B can detect the release of the SD-B tip portion from the HD pairing spot and can send a signal to the HD (e.g., a notification signal) that informs HD of the release of the tip portion of the SD-B. HD can receive the notification signal from SD-B and can process the timing information associated with the two signals (that represent the SD-B tip release from the HD pairing spot) to determine their time-coincidence. If the two signals are sufficiently coincident in time (e.g., occur within a 50 msec window), a persistent wireless link (or connection) can be established between the HD and SD-B.

Figure 18:
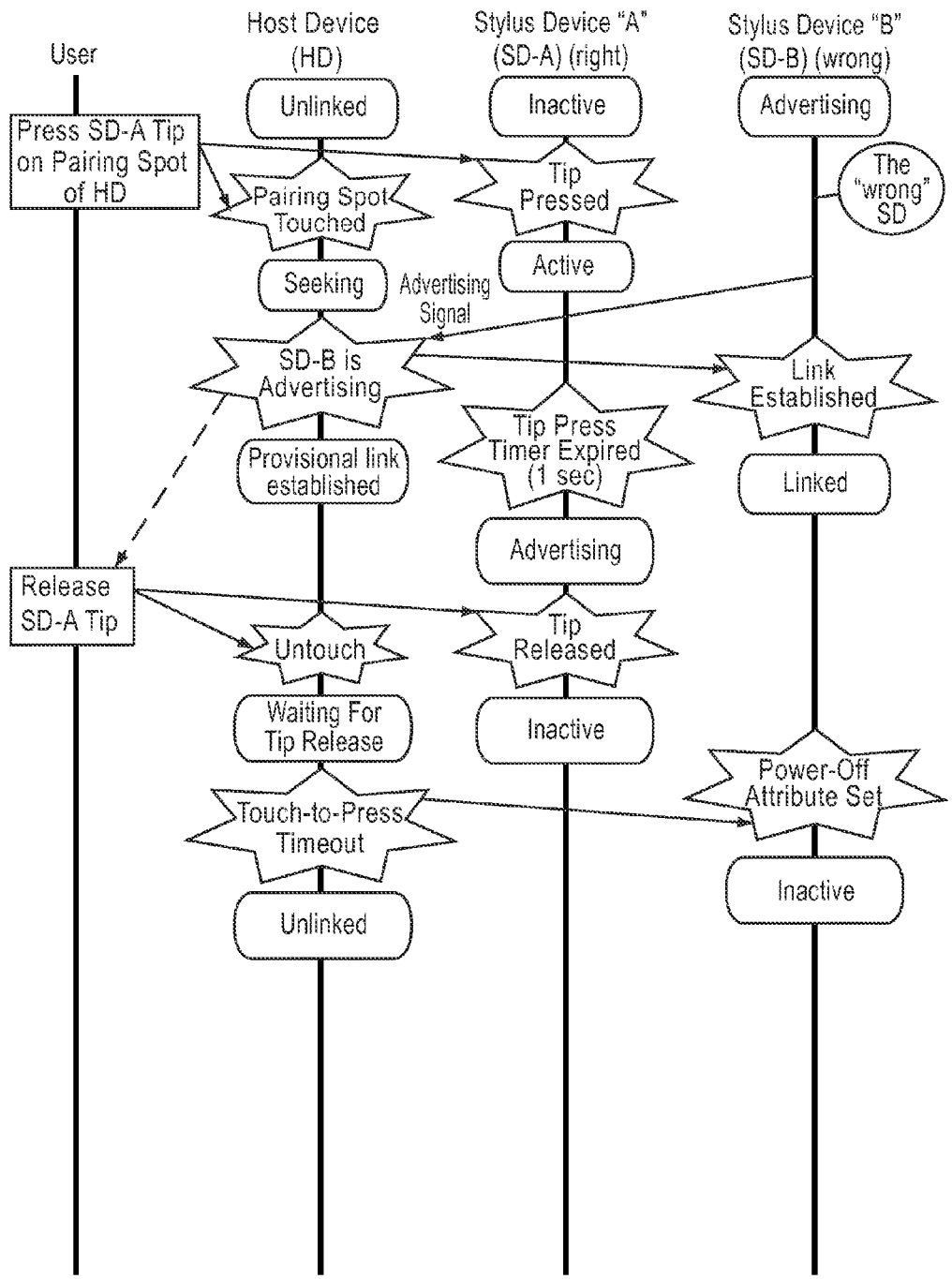
FIG. 18 is a flowchart illustrating a method for an accidental connection of a host device with an incorrect stylus device, according to an embodiment.

FIG. 18 is a flowchart illustrating a method for an accidental connection of a host device with an incorrect stylus device, according to an embodiment. In this scenario, initially, the HD is in an unlinked state (not paired with any SD), the target (or right) stylus device (SD-A) is in an inactive state (not paired with any HD), the wrong (or unintentional) stylus device (SD-B) is in an advertising state (e.g., because the SD-B has been pressed against a surface of any another device), and both SD-A and SD-B are within range of HD. The user can press the tip portion the right stylus device (SD-A) on the pairing spot of HD. Detection of the pressing of the SD-A tip portion on the pairing spot on the HD can activate SD-A. Additionally, the HD can also independently detect pressing of the SD-A tip portion on the surface of the HD and can enter into, for example, a seeking state. In the seeking state, HD can send a signal to detect all wireless devices within range. While in the seeking state, HD can receive the advertising signal sent from the wrong SD (because SD-B is already in an advertising state). This can establish a provisional link with the SD-B (SD-B is now in the linked state). If the SD-A tip portion is pressed against the pairing spot of HD for a relatively long pre-determined time period (e.g., between 1 sec and 10 sec), SD-A can also enter into an advertising state. Upon establishing the provisional linked state with SD-B, HD can send a signal to the user alerting the user of the establishment of the provisional link. The user can release the SD-A tip portion from the pairing spot on the HD. The HD can independently detect the release of the SD-A tip portion from the pairing spot (e.g., via a signal(s) from the touch sensors in HD) and can wait to receive a signal (e.g., a notification signal) from SD-A or SD-B.

SD-A can detect the release of the SD-A tip portion from HD pairing spot. Because SD-A is not in a provisional linked state with HD, SD-A does not send a signal (e.g., a notification signal) to HD informing HD of the release of the SD-A tip portion from the pairing spot on HD and returns to an inactive state (after the SD-A tip release). HD does not receive a notification signal from either SD-A or SD-B (SD-B does not send a notification signal to HD because the SD-B tip portion was not released from the pairing spot on HD). If HD does not receive a notification signal within a pre-determined time window of the detection of the release of the SD-A tip portion, a timer circuitry sends a signal such that HD enters into an unlinked state. When in the unlinked state, HD does not communicate with either SD-A or SD-B and thus the power-off circuitry in SD-B is engaged and SD-B enters into an inactive state. Subsequently, the user can initiate and establish a wireless pairing session between the HD and the SD-A as shown in FIG. 6.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
    a first device, including:
        a sensor to measure a first user action in connection with the first device, the first user action having a first characteristic at a first time;
        a touchscreen device;
        a wireless receiver to receive a signal from a second device that includes information relating to a second user action in connection with the second device, the second user action having a second characteristic at a second time, wherein the second user action comprises a motion of the second device and the second characteristic comprises a motion characteristic of the second device, and wherein the difference between the first time and the second time is between zero seconds and thirty seconds; and
        a processor operatively coupled to the sensor and the wireless receiver, the processor to:
            set at least one of a location, a size, or a color of a pairing spot displayed on the touchscreen device;
            establish an unauthenticated wireless connection between the first device and the second device; and
            authenticate the wireless connection between the first device and the second device when:
                a difference between the first time associated with the first characteristic and the second time associated with the second characteristic is below a maximum value, and
                the signal received by the wireless receiver includes information indicating that the second characteristic of the second user action in connection with the second device corresponds to an expected characteristic; and
        the second device, wherein the second device comprises a stylus device, the second user action comprises a detection of a sensor in a tip of the stylus device that the tip of the stylus device is in contact with the pairing spot, and the first user action includes a detection by the touchscreen device that the tip of the stylus device touched the pairing spot.

2. The apparatus of claim 1, wherein the wireless connection uses any of the Bluetooth protocol, the IEEE 802.11 Wi-Fi protocol, or the Near Field Communication (NFC) protocol.

3. The apparatus of claim 1, wherein the sensor includes an accelerometer.

4. The apparatus of claim 1, wherein the first device is an electronic device selected from the group consisting of a tablet computer, a cell phone, a laptop, and a smartphone.

5. The apparatus of claim 1, wherein the stylus device includes:
    a processor;
    the sensor in the tip of the stylus device in communication with the processor to measure the second user action;
    a wireless transmitter operably coupled to the processor, the wireless transmitter to send the signal to the first device; and
    another wireless receiver operably coupled to the processor to receive an authentication confirmation from the first device to establish the authenticated wireless connection between the first device and the second device, wherein the authentication confirmation is based on:
        a determination by the first device that the second characteristic associated with the second user action corresponds to the expected characteristic, and
        a determination that performance of the second user action at the second time is within a pre-determined time period of performance of the first user action.

6. The apparatus of claim 5, wherein the wireless connection uses any of the Bluetooth protocol, the IEEE 802.11 Wi-Fi protocol, or the Near Field Communication (NFC) protocol.

7. The apparatus of claim 5, wherein the first user action includes a physical contact of the second device against the first device.

8. The apparatus of claim 5, wherein the sensor includes a capacitive touch sensor.

9. The apparatus of claim 5, wherein the first device is an electronic device selected from the group consisting of a tablet computer, a cell phone, a laptop, and a smartphone.

10. The apparatus of claim 5, wherein the second user action also comprises a motion of the second device and the second characteristic comprises a motion characteristic of the second device.

11. The apparatus of claim 5, wherein the second device comprises at least one of an accelerometer and a gyroscopic sensor.

12. The apparatus of claim 1, wherein the sensor comprises a capacitive touch sensor.

13. The apparatus of claim 1, wherein a single user action is interpreted by the first device as the first action and is interpreted by the second device as the second action.

14. An apparatus, comprising:
    a first device, including:
        a sensor to measure a first user action in connection with the first device, the first user action having a first characteristic at a first time;
        a touchscreen device;
        a wireless receiver to receive a signal from a second device that includes information relating to a second user action in connection with the second device, the second user action having a second characteristic at a second time; and
        a processor operatively coupled to the sensor and the wireless receiver, the processor to:
            set at least one of a location, a size, or a color of a pairing spot displayed on the touchscreen device;
            establish an unauthenticated wireless connection between the first device and the second device; and
            authenticate the wireless connection between the first device and the second device when:
                a difference between the first time associated with the first characteristic and the second time associated with the second characteristic is below a maximum value, and
                the signal received by the wireless receiver includes information indicating that the second characteristic of the second user action in connection with the second device corresponds to an expected characteristic; and
        the second device, wherein the second device comprises a stylus device, the second user action comprises a detection of a sensor in a tip of the stylus device that the tip of the stylus device is in contact with the pairing spot, and the first user action includes:
- a detection that the touchscreen device that the tip of the stylus device touched the pairing spot; and
- a motion of the first device.

15. An apparatus, comprising:
a first device, including:
- a sensor to measure a first user action in connection with the first device, the first user action having a first characteristic at a first time, wherein the first characteristic is a motion parameter of the first device;
- a touchscreen device;
- a wireless receiver to receive a signal from a second device that includes information relating to a second user action in connection with the second device, the second user action having a second characteristic at a second time; and
- a processor operatively coupled to the sensor and the wireless receiver, the processor to:
  - set at least one of a location, a size, or a color of a pairing spot displayed on the touchscreen device;
  - establish an unauthenticated wireless connection between the first device and the second device; and
  - authenticate the wireless connection between the first device and the second device when:
    - a difference between the first time associated with the first characteristic and the second time associated with the second characteristic is below a maximum value, and
    - the signal received by the wireless receiver includes information indicating that the second characteristic of the second user action in connection with the second device corresponds to an expected characteristic; and the second device, wherein the second device comprises a stylus device, the second user action comprises a detection of a sensor in a tip of the stylus device that the tip of the stylus device is in contact with the pairing spot, and the first user action includes: a detection that the touchscreen device that the tip of the stylus device touched the pairing spot.

16. An apparatus, comprising:
a first device, including:
- a sensor to measure a first user action in connection with the first device, the first user action having a first characteristic at a first time;
- a touchscreen device;
- a wireless receiver to receive a signal from a second device that includes information relating to a second user action in connection with the second device, the second user action having a second characteristic at a second time; and
- a processor operatively coupled to the sensor and the wireless receiver, the processor to:
  - set at least one of a location, a size, or a color of a pairing spot displayed on the touchscreen device;
  - establish an unauthenticated wireless connection between the first device and the second device; and
  - authenticate the wireless connection between the first device and the second device when:
    - a difference between the first time associated with the first characteristic and the second time associated with the second characteristic is below a maximum value, and
    - the signal received by the wireless receiver includes information indicating that the second characteristic of the second user action in connection with the second device corresponds to an expected characteristic; and the second device, wherein the second device comprises a stylus device, the second user action comprises a detection of a sensor in a tip of the stylus device that the tip of the stylus device is in contact with the pairing spot, and the first user action includes:
- a detection that the touchscreen device that the tip of the stylus device touched the pairing spot; and
- a motion of the first device.

* * * * *